United States Patent
Yoneyama et al.

(10) Patent No.: US 6,944,717 B2
(45) Date of Patent: Sep. 13, 2005

(54) CACHE BUFFER CONTROL APPARATUS AND METHOD USING COUNTERS TO DETERMINE STATUS OF CACHE BUFFER MEMORY CELLS FOR WRITING AND READING DATA THEREFROM

(75) Inventors: Koji Yoneyama, Kawasaki (JP); Yuichi Hirao, Tokyo (JP); Shigeru Hatakeyama, Kawasaki (JP); Aaron Olbrich, Morgan Hill, CA (US); Douglas Prins, Laguna Hills, CA (US)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 10/193,755

(22) Filed: Jul. 11, 2002

(65) Prior Publication Data

US 2003/0023815 A1 Jan. 30, 2003

Related U.S. Application Data

(60) Provisional application No. 60/308,389, filed on Jul. 27, 2001.

(51) Int. Cl.[7] .............................................. G06F 12/00
(52) U.S. Cl. ........................ 711/133; 711/156; 711/159; 710/57
(58) Field of Search ................................ 711/133, 134, 711/136, 154, 118, 158, 159, 144, 156, 3; 710/57, 56

(56) References Cited

U.S. PATENT DOCUMENTS

| | | | | |
|---|---|---|---|---|
| 5,909,695 A | * | 6/1999 | Wong et al. ................. | 711/133 |
| 6,016,529 A | * | 1/2000 | Woodman ....................... | 711/3 |
| 6,065,099 A | * | 5/2000 | Clark et al. ................. | 711/133 |
| 6,189,080 B1 | * | 2/2001 | Ofer ........................... | 711/167 |
| 6,209,062 B1 | * | 3/2001 | Boland et al. .............. | 711/134 |
| 6,598,125 B2 | * | 7/2003 | Romm ......................... | 711/133 |

* cited by examiner

*Primary Examiner*—Mano Padmanabhan
*Assistant Examiner*—Jasmine Song
(74) *Attorney, Agent, or Firm*—Greer, Burns & Crain, Ltd.

(57) ABSTRACT

Methods for controlling and storing data in a cache buffer in a storage apparatus having a nonvolatile memory medium are disclosed. Memory cells are logically divided into a plurality of pages. An open status is registered in a counter for each page that has at least some (and usually all) memory cells available to store new data. A full status is registered in the counter for each page that does not have memory cells that are available to store new data. New data is stored in pages having the open status in the counter. The pages can be weighted according to the read command rate and prioritized for reading and writing purposes.

12 Claims, 20 Drawing Sheets

| PAGE | 0 | 1 | 2 | 3 | 4 | 5 | | N |
|---|---|---|---|---|---|---|---|---|
| SIZE | X | X | X | X | X | X | — | X |
| COUNTER | 1 | 1 | 0 | 1 | 0 | 0 | | |
| STATUS | HOLD | HOLD | OPEN | HOLD | OPEN | OPEN | | |

Free areas: between pages 1–2 (FREE AREA), between pages 3–4 (FREE AREA), between pages 4–5 (FREE AREA).

FIG. 3

RATIO

| READ COMMAND RATE | WEIGHT RATE |
|---|---|
| 0% | 0 |
| 1% - 34% | 1 |
| 35% - 67% | 2 |
| 68% - 100% | 3 |

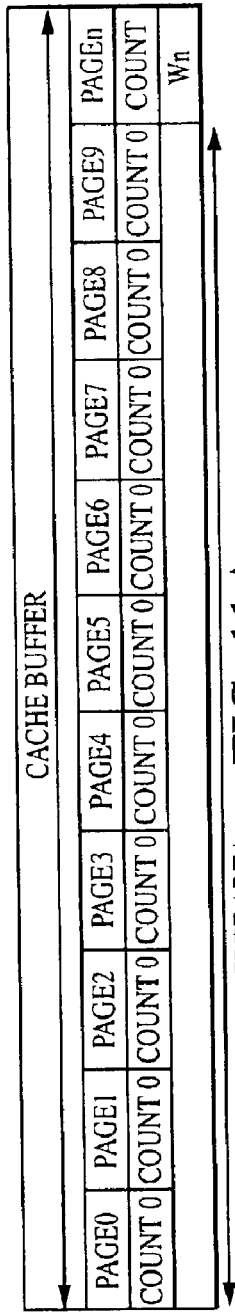
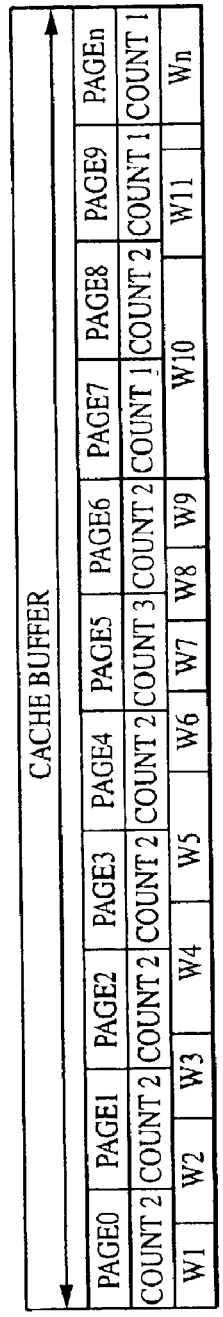
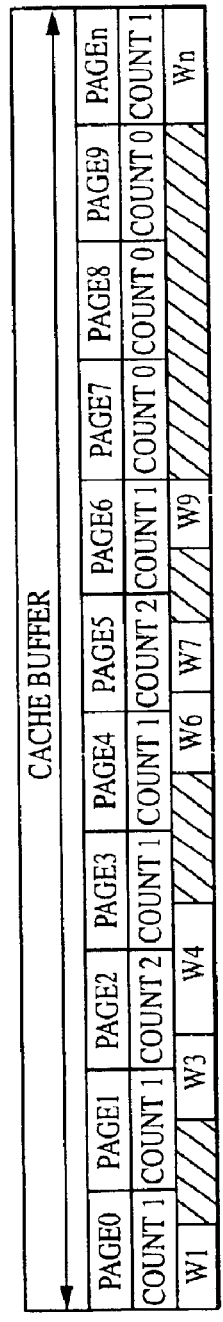

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | OPEN | HOLD | OPEN | OPEN | HOLD | HOLD | HOLD | HOLD | HOLD |
| COMMAND | WT | 0 | WT | 0 | WT | WT | WT | WT | WT | WT |
| COUNT | 1 | 0 | 1 | 0 | 1 | 1 | 1 | 1 | 1 | 1 |
| SHADOW | 0 | 0 | 0 | 0 | 0 | 0 | 0 | 0 | 0 | 0 |

FIG. 13A

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | OPEN | OPEN | HOLD | HOLD | HOLD | HOLD | HOLD |
| COMMAND | WT | R1 | WT | 0 | WT | WT | WT | WT | WT | WT |
| COUNT | 1 | 1 | 1 | 0 | 1 | 1 | 1 | 1 | 1 | 1 |
| SHADOW | 0 | 2 | 0 | 0 | 0 | 0 | 0 | 0 | 0 | 0 |

FIG. 13B

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | HOLD | OPEN | HOLD | HOLD | HOLD | HOLD | HOLD |
| COMMAND | WT | R1 | WT | R2 | 0 | WT | WT | WT | WT | WT |
| COUNT | 1 | 1 | 1 | 1 | 0 | 1 | 1 | 1 | 1 | 1 |
| SHADOW | 0 | 1 | 0 | 2 | 0 | 0 | 0 | 0 | 0 | 0 |

FIG. 13C

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | HOLD | HOLD | HOLD | HOLD | HOLD | HOLD | HOLD |
| COMMAND | WT | R1 | WT | R2 | R3 | WT | WT | WT | WT | WT |
| COUNT | 1 | 0 | 1 | 1 | 1 | 1 | 1 | 1 | 1 | 1 |
| SHADOW | 0 | 0 | 0 | 1 | 2 | 0 | 0 | 0 | 0 | 0 |

FIG. 13D

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | OPEN | HOLD | HOLD | HOLD | HOLD | HOLD | HOLD | HOLD | HOLD |
| COMMAND | WT | R1 | WT | R2 | R3 | WT | WT | WT | WT | WT |
| COUNT | 1 | 0 | 1 | 1 | 1 | 1 | 1 | 1 | 1 | 1 |
| SHADOW | 0 | 0 | 0 | 1 | 2 | 0 | 0 | 0 | 0 | 0 |

FIG. 13E

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | HOLD | HOLD | HOLD | HOLD | HOLD | HOLD | HOLD |
| COMMAND | WT | R4 | WT | R2 | R3 | WT | WT | WT | WT | WT |
| COUNT | 1 | 1 | 1 | 1 | 1 | 1 | 1 | 1 | 1 | 1 |
| SHADOW | 0 | 2 | 0 | 0 | 1 | 0 | 0 | 0 | 0 | 0 |

FIG. 13F

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | OPEN | HOLD | HOLD | HOLD | HOLD | HOLD | HOLD |
| COMMAND | WT | R4 | WT | R2 | R3 | WT | WT | WT | WT | WT |
| COUNT | 1 | 1 | 1 | 0 | 1 | 1 | 1 | 1 | 1 | 1 |
| SHADOW | 0 | 2 | 0 | 0 | 1 | 0 | 0 | 0 | 0 | 0 |

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | OPEN | OPEN | HOLD | HOLD | HOLD | HOLD | HOLD |
| COMMAND | WT | R1 | WT | - | - | WT | WT | WT | WT | WT |
| COUNT | 1 | 1 | 1 | 0 | 0 | 1 | 1 | 1 | 1 | 1 |
| SHADOW | 0 | 2 | 0 | 0 | 0 | 0 | 0 | 0 | 0 | 0 |

FIG. 14B

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | HOLD | OPEN | HOLD | HOLD | HOLD | HOLD | HOLD |
| COMMAND | WT | R1 | WT | R2 | - | WT | WT | WT | WT | WT |
| COUNT | 1 | 1 | 1 | 1 | 0 | 1 | 1 | 1 | 1 | 1 |
| SHADOW | 0 | 1 | 0 | 2 | 0 | 0 | 0 | 0 | 0 | 0 |

FIG. 14C

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | HOLD | HOLD | HOLD | HOLD | HOLD | HOLD | HOLD |
| COMMAND | WT | R1 | WT | R2 | W1 | WT | WT | WT | WT | WT |
| COUNT | 1 | 1 | 1 | 1 | 1 | 1 | 1 | 1 | 1 | 1 |
| SHADOW | 0 | 0 | 0 | 1 | 0 | 0 | 0 | 0 | 0 | 0 |

FIG. 14D

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | OPEN | HOLD | HOLD | HOLD | HOLD | HOLD | HOLD | HOLD | HOLD |
| COMMAND | WT | R1 | WT | R2 | W1 | WT | WT | WT | WT | WT |
| COUNT | 1 | 0 | 1 | 1 | 1 | 1 | 1 | 1 | 1 | 1 |
| SHADOW | 0 | 0 | 0 | 1 | 0 | 0 | 0 | 0 | 0 | 0 |

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | HOLD | HOLD | HOLD | HOLD | HOLD | HOLD | HOLD |
| COMMAND | WT | R3 | WT | R2 | W1 | WT | WT | WT | WT | WT |
| COUNT | 1 | 1 | 1 | 1 | 1 | 1 | 1 | 1 | 1 | 1 |
| SHADOW | 0 | 2 | 0 | 0 | 0 | 0 | 0 | 0 | 0 | 0 |

FIG. 14E

| FREE AREA | PAGE 0 | PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|---|---|
| STATUS | HOLD | HOLD | HOLD | OPEN | HOLD | HOLD | HOLD | HOLD | HOLD | HOLD |
| COMMAND | WT | R3 | WT | R2 | W1 | WT | WT | WT | WT | WT |
| COUNT | 1 | 1 | 1 | 0 | 1 | 1 | 1 | 1 | 1 | 1 |
| SHADOW | 0 | 2 | 0 | 0 | 0 | 0 | 0 | 0 | 0 | 0 |

CACHE BUFFER CONTROL APPARATUS AND METHOD USING COUNTERS TO DETERMINE STATUS OF CACHE BUFFER MEMORY CELLS FOR WRITING AND READING DATA THEREFROM

This application is a continuation of U.S. Provisional Application Ser. No. 60/308,389, filed Jul. 27, 2001.

BACKGROUND OF THE INVENTION

1. Field of the Invention

This invention relates to cache buffer control methods and algorithms for hard disk and tape drives, and more particularly to methods and algorithms for organizing a cache buffer and identifying memory cells in the cache buffer that are available for reading and writing operations.

2. Description of the Related Art

In a typical computer system, data is processed in a host unit and stored in a memory for later retrieval and further processing. A commonly used memory is a hard disk or tape drive having a nonvolatile storage medium on which data is written and read in response to commands from the host unit. For easier understanding, this invention will be described in connection with a hard disk drive having a magnetic disk, but it is contemplated that the storage medium could be a magnetic disk drive, an optical disk drive, a tape drive, etc.

Writing and reading processes are controlled internally within the hard disk drive by a dedicated central processing unit (CPU) provided for disk drive control. Among other things, the CPU uses volatile memory such as a cache buffer in the hard disk drive (or in the host unit) to expedite writing and reading operations and more efficiently serve the host unit.

FIG. 17 shows a schematic structure of a known cache buffer. Each memory cell in the cache buffer has a memory address. The CPU stores data in the cache buffer according to these addresses, usually in blocks called LBAs (Logical Block Addresses). In FIG. 17, W1 represents data to be written to disk in response to a first write command, and W2–W5 represent data to be written in response to successive write commands. R1, R2 and R3 represent data to be read from the disk in response to successive read commands. Separate logical and/or physical cache buffers are used for reading and writing, respectively. The read and write buffers are ring buffers, so when the write buffer is filled, W5 data must be held until the cache is written to disk, or it overwrites W1 data. The situation is the same for the read buffer. In the alternative, the CPU must break up the data and store it among several areas of the cache buffer. Both the two-buffer regime of the cache buffer and the method of storing and overwriting data are inefficient and time consuming, and slow the response time of the hard disk drive. Accordingly, one object of this invention is to provide new and improved cache buffer control methods and algorithms for hard disk drives and the like.

Another object is to provide new and improved organizational schemes for memory cells in a cache buffer.

Still another object is to provide new and improved cache buffer control methods and apparatus for identifying available memory in a cache buffer for reading and writing data from and to a hard disk drive or the like.

SUMMARY OF THE INVENTION

The present invention encompasses methods for storing data in a cache buffer in a storage apparatus having a nonvolatile memory medium, the cache buffer having a plurality of volatile memory cells, that can be used for both reading to and writing from the non-volatile memory in a unitary manner. The methods include the steps of: logically dividing the memory cells into a plurality of pages, registering an open status in a counter for each page in which at least some (and usually all) memory cells are available to store new data, registering a full status in the counter for each page that does not have memory cells that are available to store new data, and storing the new data in pages having the open status.

Further, the present invention encompasses methods for searching empty space in a cache buffer, comprising the steps of: searching empty space by checking values of page counters provided for respective pages comprised of plural continuous memory cells in the cache buffer. With the methods of the present invention, a weight rate is determined from a read command rate. The read command rate is the number of read commands divided by the total number of read and write commands, expressed as a percentage. The weight rate is assigned to shadow counters provided for the respective pages. The weight rate is used to prioritize commands.

Furthermore, the present invention encompasses methods for controlling a cache buffer, comprising the steps of: determining if pages are open status or not based upon values of page counters provided for respective pages comprised of plural continuous memory cells in the cache buffer, and storing data into the pages determined as having open status in the step of determining. With the methods of the present invention, during storing of write data for write commands of sequential access, i.e., where one write command is followed by another write command, and/or one string or block of data is followed by a successive related block of data, where the cache buffer is placed in a buffer full status, data write operations of write data of sequential access write commands are given priority.

Furthermore, the present invention encompasses control apparatus for a disk drive having a cache memory, the cache memory being comprised of memory cells, the memory cells being logically divided into a plurality of pages, including: page counters provided for the respective pages; and a controller that updates the values of the page counters dependent upon completion of data transfer of data stored in the pages. With the apparatus of the present invention, means for determining weight rate based upon the calculated read command rate, means for storing data into the pages of the cache buffer where the pages have an open status, and means for changing a priority of data write operations of write data of sequential access write commands where the cache buffer is placed in a buffer full status during storing of write data of write commands of sequential access may be provided.

These and other objects of the present invention and specific embodiments thereof will become apparent to those skilled in the art from the following detailed description of the invention, the accompanying drawings, and the appended claims.

BRIEF DESCRIPTION OF DRAWINGS

FIG. 3 is a diagram showing the manner in which a cache buffer is organized for page cache according to the present invention.

FIG. 8 shows a table storing the relationship between the read command rate and the weight rate.

FIGS. 11(A)–11(E) are charts of another data transfer operation of this invention.

FIGS. 13(A)–13(G) are charts that describe a first embodiment of a shadow counter in a command history operation that protects read data in a cache buffer according to the present invention.

FIGS. 14(A)–14(F) are charts that describe another embodiment of a shadow counter in a command history operation that protects read data in a cache buffer according to the present invention.

DETAILED DESCRIPTION OF THE PRESENT INVENTION

Figure 1:
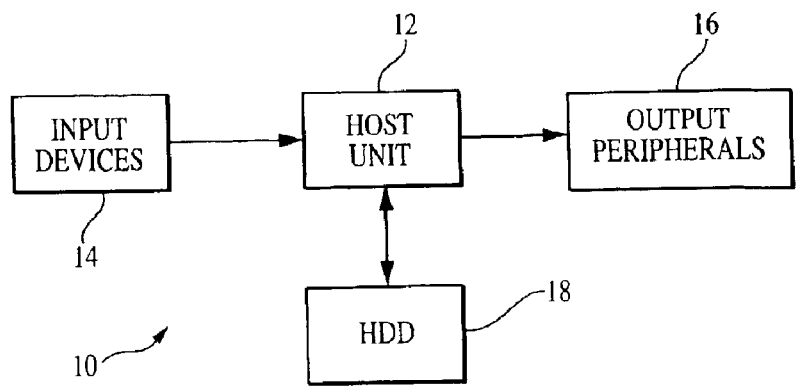
FIG. 1 is a block diagram of a computer system.

FIG. 1 shows a block diagram of a computer system 10. The computer system 10 includes a host unit 12, at least one input device 14 and at least one peripheral device 16. The host unit 12 can be a typical personal computer or the like having a central processing unit, random access memory (RAM) and so forth, for processing data provided by the input device 14. The input device 14 could be a keyboard, data, video or audio source, and the like. The peripherals 16 can include one or more printers, displays, etc.

The computer system 10 also has at least one hard disk drive (HDD) 18 for nonvolatile storage of data. The HDD 18 typically includes a magnetic recording medium, but could also be an optical storage medium, a tape or any other suitable nonvolatile medium.

Figure 2:
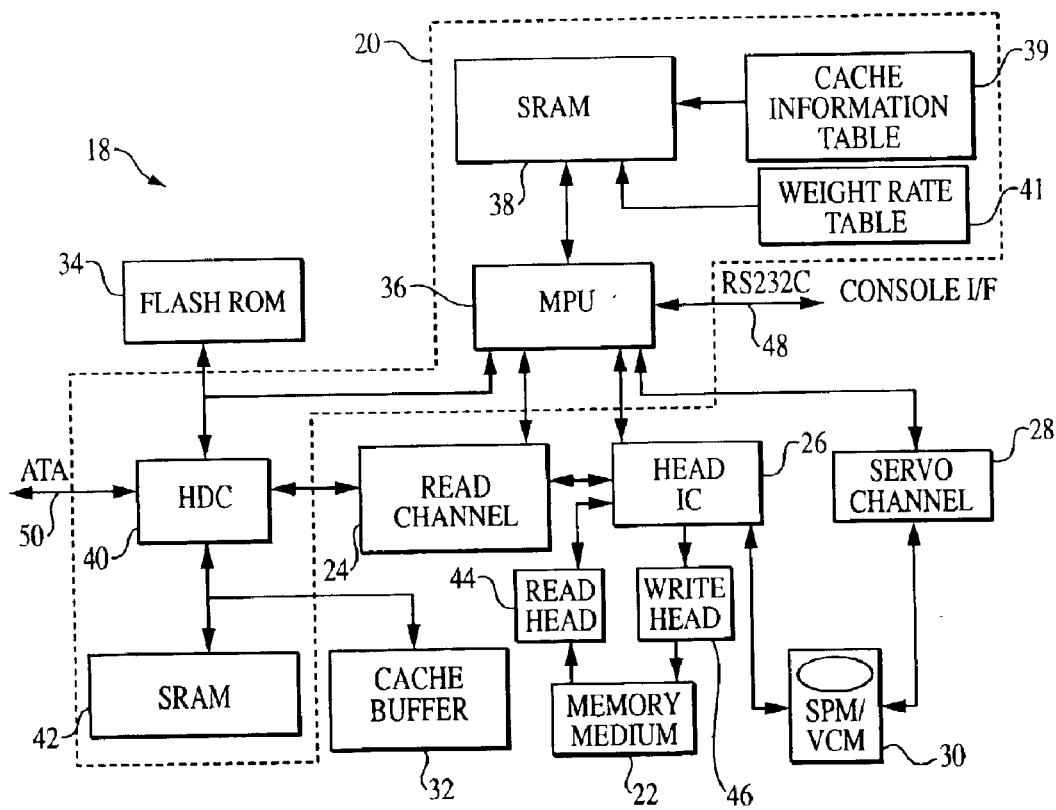
FIG. 2 is a diagram showing a schematic structure of a hard disk drive.

FIG. 2 is a diagram showing a schematic structure of the hard disk drive 18. The HDD 18 includes a controller 20, a nonvolatile memory medium 22, a read channel 24, a head IC 26, a servo channel circuit 28, a spindle motor and voice coil motor (SPM/VCM) 30, a cache buffer 32 and a flash ROM 34. The controller 20 includes a processor (MPU) 36, an S-RAM 38 having a cache information table 39 and a weight rate table 41, a hard drive controller 40 and an S-RAM 42. A read head 44 and a write head 46 are also provided.

The general operation of the HDD 18 is as follows. The host unit 12 sends read and write commands to the MPU 36 through a suitable connection such as RS232C port 48 in order to connect it to a console interface (I/F) of an external device. The MPU 36 executes the read and write commands through the hard disk controller 40, which prioritizes the various commands and directly supervises reading and writing to and from the memory medium 22. The HDC 40 uses the volatile memory in the cache buffer 32 to better supervise reading and writing from and to the memory medium 22. Data is received from and transferred to the host unit 12 through an ATA port 50 or the like in order to communicate with the personal computer, which issues ATA read/write commands.

The cache buffer 32 is used in several ways. For example, at times the HDC 40 accumulates incoming data in the cache buffer 32 so that data can be written to the memory medium 22 in a continuous manner at a rate acceptable to the hard disk device. The cache buffer 32 can also be used to assemble data read from the memory (disk) medium 22, particularly when data is stored in several places in the memory medium 22. The cache buffer 32 can be used to process sequential read commands or sequential write commands. The cache buffer 32 is also useful when read and write commands are interspersed with each other, and when multiple write and read commands are received virtually simultaneously.

When the host unit 12 issues read and/or write commands, the HDD 18 accumulates data in the cache buffer 32 from the host unit 12 if the command is a write command, or from the storage medium 22 if the command is a read command. At an appropriate time, the HDC 40 issues a cache-hit command that causes data in the cache buffer 32 to be transferred to the host unit 12 or the memory medium 22.

FIG. 3 is a diagram showing the manner in which the cache buffer 32 is organized for control purposes, called "page cache". As seen in FIG. 3, the cache buffer 32 is logically divided into blocks called "pages" 0,1, 2, . . . N. The number of pages is determined based upon a memory size, and thus the number of pages may be varied dependent upon memory size. Areas in the cache buffer that are secured for read and/or write data transfer operations in a free area search operation are called "free areas". Each page may have thirty-two sectors, with each sector including 112 bytes of memory cells.

Some or all of the memory cells in each page can be available for reading and/or writing data at any given time. All the memory cells of the cache buffer may be used either for write data or read data. This means that the cache buffer is shared for both read data transfer operations and write data transfer operations.

To share one cache buffer for both read data transfer operations and write data transfer operations, page cache and a page counter are used. If page counters of pages have a specific value, e.g. "0", then that indicates that the respective pages are open status. The open status corresponds to an empty (or available) status. These pages are regarded as free spaces. If the page counters of pages have such specific values, the pages are free spaces, and the pages are usable for both read and write accesses. Of course, a cache buffer is constructed such that all memory cells of the cache buffer are assigned to be addressable for both read access and write access under control of the MPU 36.

The size of each page is stored in a register or the like. Namely, a value "32" corresponding to the number of sectors in one page is held in a register or a storage location of the S-RAM 38. Also, the cache information table 39, which stores the status of each of the pages, is prepared. The MPU 36 when powered on creates the table 39 in the S-RAM 38.

The table 39 stores a count value of "Count" as shown in FIG. 3 for the respective pages 0–N of the cache buffer 32. Thus, the table relates the page counters to the pages. Whether a page is empty or not is managed based upon the "count" for a page. The count value of a page amounts to an indication of the status of data in each page. Where the count value of a page is "1" or more, it means that the page is in a "HOLD" status. A "HOLD" status means that the data in a particular page should not be overwritten. Where the count value of a page is "0", it means that the page is in an "Open" status. An "Open" status indicates that all of the memory cells of the page can be rewritten. Importantly, an "Open" status means that all of the memory cells of the page are available to other data of either a read command or a write command. Such an area having "Open" status is available for free area search operations and is eligible to be a free area.

MPU 36 determines if there are free areas in the cache buffer through a free area search operation at the time of a command receipt, during a data read/write, and/or at the time of completion of data transfer. In the free area search operations, MPU 36 checks values of the respective counters of all of the pages. The values of the counter may be stored in the table created in the embedded memory within MPU 36.

MPU 36 may utilize several types of free area search operations such as below:

(1) The search size for free areas is set to a fixed number of pages. A search reveals whether there is a continuous free area in which the number of pages each having "Open" status matches with a fixed number of pages. If the fixed number of open status pages is not found in the search, the search is repeated periodically until it is found.

(2) A minimum number and a maximum number are set for free area search. In this free area search, the total number of pages between the minimum number and the maximum number is searched for, and continuous pages each having "Open" status are secured.

(3) Only a minimum number is defined, and then, a continuous free area corresponding to the number of pages is searched for to secure as many continuous pages each having "Open" status as possible.

(4) The search size is not set, and then, a continuous free area corresponding to the number of pages is searched for to secure as many continuous pages each having "Open" status as possible.

(5) The search size is not set, and then, a continuous free area corresponding to the number of pages which can store sector numbers requested by commands, is searched for and determined.

Based upon operation circumstances of the disk drive, these free area search operations are selected such that the disk drives have one or more of these free area search operations. The secured number of continuous pages in the free area search operation may be varied dependent upon different free area search patterns and how many pages with "Open" status remain in the cache buffer.

For example, for write operations, the free area search patterns (3) and (4) may be assigned. In that case, when it is required, the pattern (3) is first used. If the free area is not found with the pattern (3), then the pattern (4) is used. For read operations, the patterns (1), (2), and (5) may he assigned. In that case, where it is required, the pattern (1) is first used for the search operation. If it cannot find the free area, then the patterns (2) and (5) are executed in that order.

For the starting point of a free area search operation, information of pages secured in the latest free area search operation is held in the embedded memory or other suitable place. The new free area search operation may be done from a page following the pages identified by the kept information.

The data is recorded in blocks such as W1, W2, etc., as shown in FIGS. 4(A)–4(G). Each block represents data relating to one command. The counter for each page indicates a "0" if no blocks are stored in the page, a "1" if only one block is stored in the page, a "2" if some or all of two blocks are stored in the page, and so on. In this manner, more than one data block can be stored in each page, and the hold status will be maintained as long as the number in the counter is not zero.

It is shown in FIG. 3 that the cache buffer has pages 0 . . . N of a predetermined size X, and a counter flag records the number of data packets W1 . . . Wn in each page. Thus, for example, data package W1 in FIG. 4(E) is entirely within page 0, but page 0 also contains part of W2. Accordingly, the page count created in the table indicates that the two data packets are in page 0. Its count is thus "2". Page 5 includes only part of data Wb, so its count is "1", and page 9 has no data, so its count is "0".

FIGS. 4(A)–4(G) describe a first way of storing data packets W1–W5. In the first way, the length of the data packets is known by the HDD when the write command is received through communications with the host system.

Figure 4A:
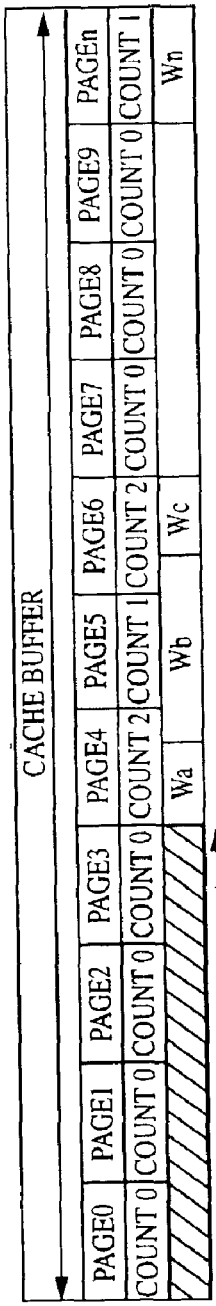
FIGS. 4(A)–4(G) are charts that describe data packet storage according to the present invention.

As shown in FIG. 4(A), data Wa, Wb and Wc are not available for erasure and rewriting since values of each of page 4–6 is one or more, so their status is "Hold" (see FIG. 3). On the other hand, values of pages 0–3 and pages 7–9 are all "0", so the status of all of these pages is "Open". In this situation, when a command for write data W1 is received, the hard drive controller (MPU) 36 executes a free area search operation. In the free area search operation, as shown in FIG. 4(A), page 0 to page 3 are found as a free area since the value of the respective counters of the continuous pages 0–3 are all "0".

Figure 4B:
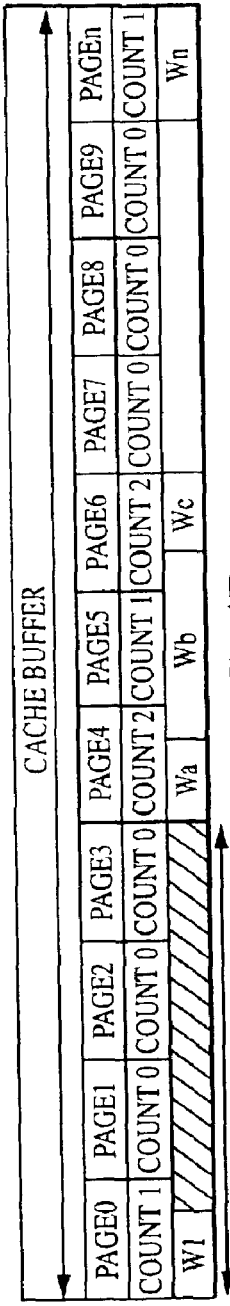
Figure 4C:
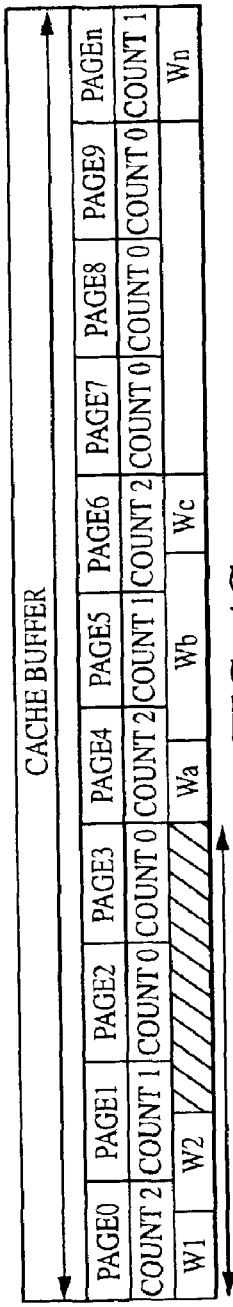

Furthermore, MPU 36 obtains the sector numbers of write data W1 to be stored in the cache buffer 32 through HDC 40 from the host computer. MPU 36 further obtains a predetermined number X1 from the S-RAM 38. Here, as shown in FIG. 4(F), the predetermined number X1 is a value less than the total sector number of one page. X1 is, e.g., "20". Further, MPU 36 calculates the total sector number of the free area, which is secured in the free search area operation, by multiplying the number of sectors in one page, e.g. "32", by the number of the pages secured in the free search operation.

When the sector number of the write data W1 is given, the MPU 36 subtracts the sector number of the write data W1 from the total sector number of the free area. It also obtains the remaining sector number of the free area, and compares the remaining sector number with the predetermined number X1. If the remaining number is greater than the number X1, it stores the write data W1 into the free area. Here, the write data W1 is stored from the least number of the pages 0–3, and increments the value of the respective page counter in the table of the page 0, as shown in FIG. 4(B). When the next write data W2 is received, MPU 36 executes the same procedures explained with respect to FIG. 4(B), and stores the write data W2 into the free area, as shown in FIG. 4(C). In FIG. 4(C), MPU 36 stores the write data W2 over the pages 0 and 1, and increments the values of the respective counters for the pages 0 and 1 by 1. The values of these counters of the pages 0 and 1 then become "2" and "1".

Figure 4D:
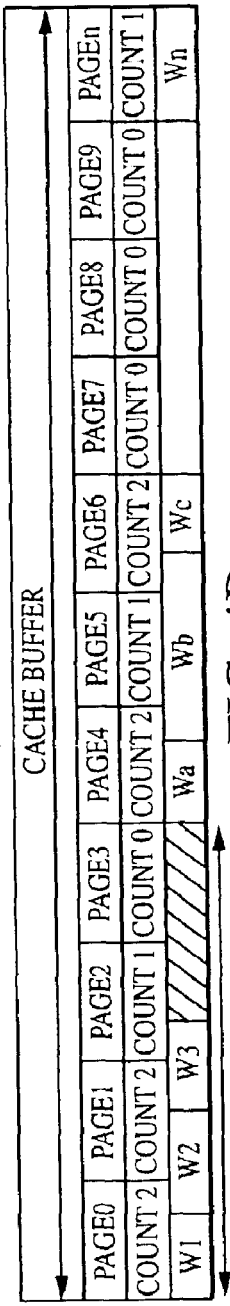
Figure 4E:
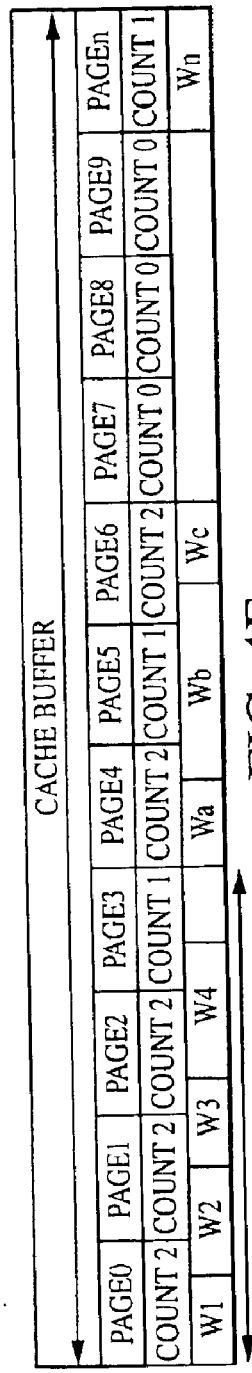
Figure 4F:
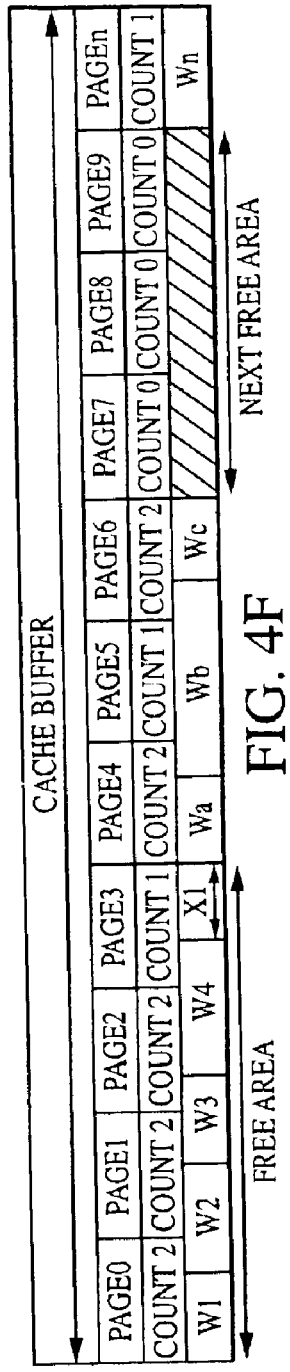

As shown in FIGS. 4(D) and 4(E), MPU 36 repeats the same procedures for write data W3 and W4, and stores the write data W3 and W4 into the cache buffer. It changes the values of the respective counters of the pages 2 and 3 during the execution of the procedures.

When write data W5 is received after storing the write data W1–W4 into the cache buffer, MPU 36 also recognizes that the remaining sector number of the free area is less than the predetermined number X1. Then, it stops operation of storing the write data W5 into the free area, even though the sector number of the write data W5 may be less than the predetermined number X1. Then, it starts a new free area search operation. As shown in FIG. 4(F), MPU 36 obtains the next free area through the new free area search operation. As explained above, the secured number of continuous pages in the free area search operation may be varied. Here, the newly found free area in the free search operation includes pages 7–9 as hatched in FIG. 4(F).

Figure 4G:
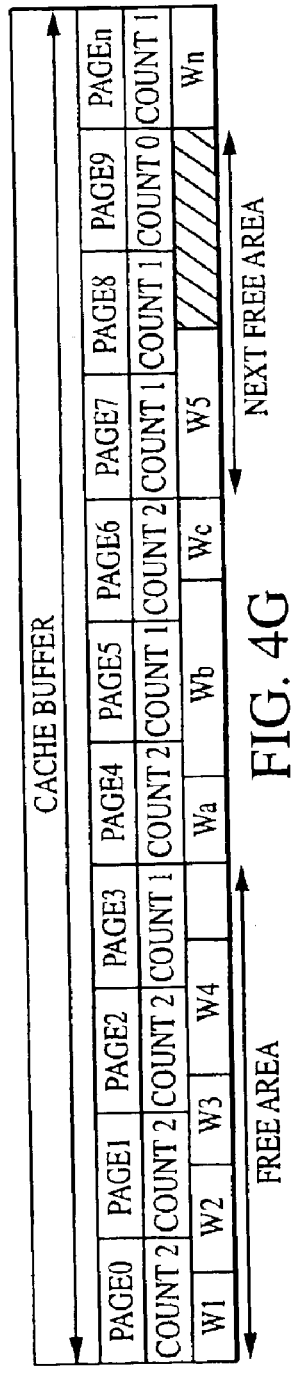

Then, the controller stores the write data W5 into the cache buffer 42 over the pages 7 and 8, and increments the values of the respective counters of the pages 7 and 8, as shown in FIG. 4(G). Namely, the sector numbers of write data W5 is larger, though, so W5 is stored in page 7 and part of page 8. The rest of page 8 and page 9 remain available for the next use, or the following commands.

By dividing the cache buffer into pages and recording the count for each page, the system can easily determine where a free space is available in the cache buffer. Furthermore, "Hold" and "Open" statuses are managed based upon values of the respective pages, so it is not necessary to divide buffer space of the cache buffer into a buffer space for write data only and a buffer space for read data only. Thus, all pages may be used only for, e.g., write data, and therefore the storage capacity of the cache buffer can be used efficiently.

Figure 5A:
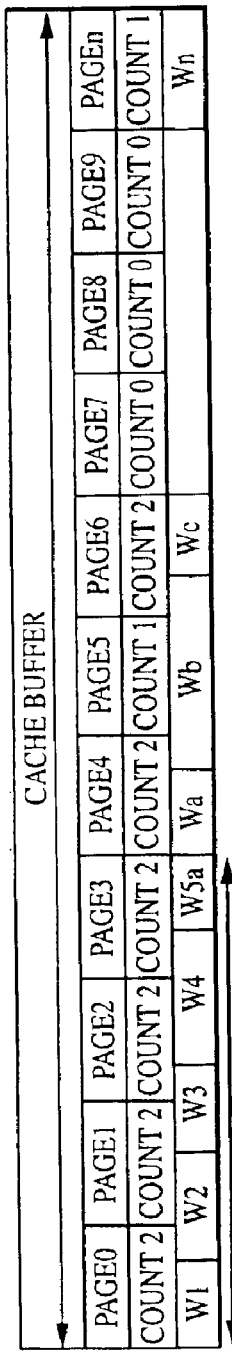
FIGS. 5(A)–5(C) are charts that describe another embodiment of data packet storage according to the present invention.
Figure 5B:
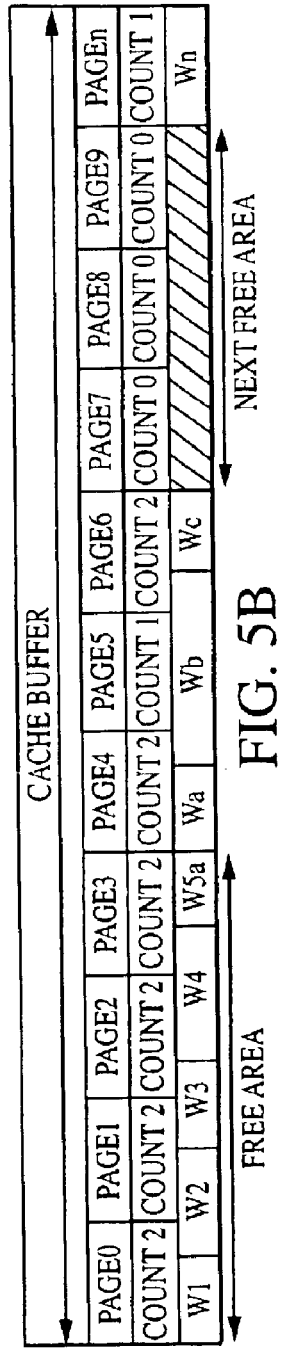
Figure 5C:
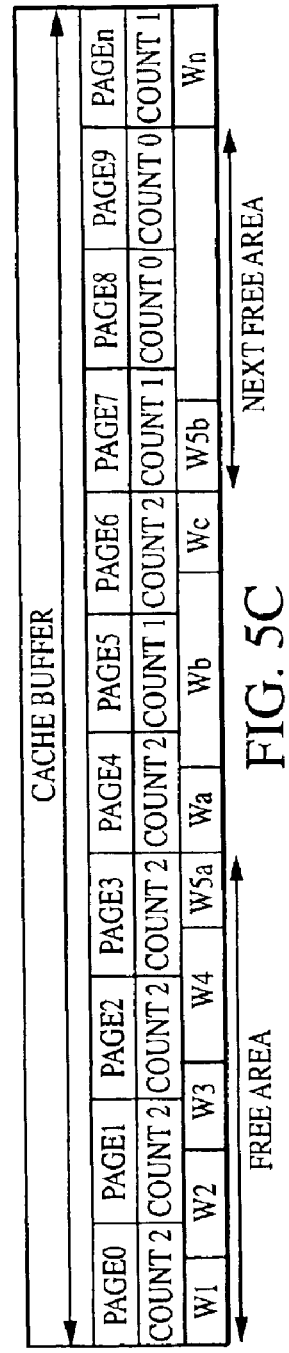

FIGS. 5(A)–5(C) describe a second way in which data packets W1–W5 are stored. In the second way, the length of the data packets is not known by the HDD when the write command is received. In that situation, W1–W5 are consecutively stored in the free area of pages 1–3 in a manner similar to the procedures described above with reference to FIGS. 4(A)–4(G). Here, the procedures executed in MPU 36 do not include comparison of the sector numbers with the predetermined number X1, since the number of sectors of respective write data is not known when storing write data W1–W5.

During storing the write data of data packets W1–W5, each time MPU 36 stores the write data into the free area of the cache buffer in a sector unit, it decrements the total number sector numbers of the secured free area. Thus, it finds insufficient space in the secured free area of pages 0–3 since there is not enough memory capacity for all data of W5 in the free area. Then, after it stores a part of the write data of W5, namely W5a, into page 3, it stops storing the remainder of write data W5 into the cache buffer, as shown in FIG. 5(A). After stopping, MPU 36 starts a new free area search operation. If it finds the next free area, pages 7–9 in FIG. 5(B), then the remainder of W5, write data W5b, is stored in page 7, as shown in FIG. 5(C). Finally, MPU 36 records in the RAM that W5 is divided into pages 3 and 7.

Figure 6A:
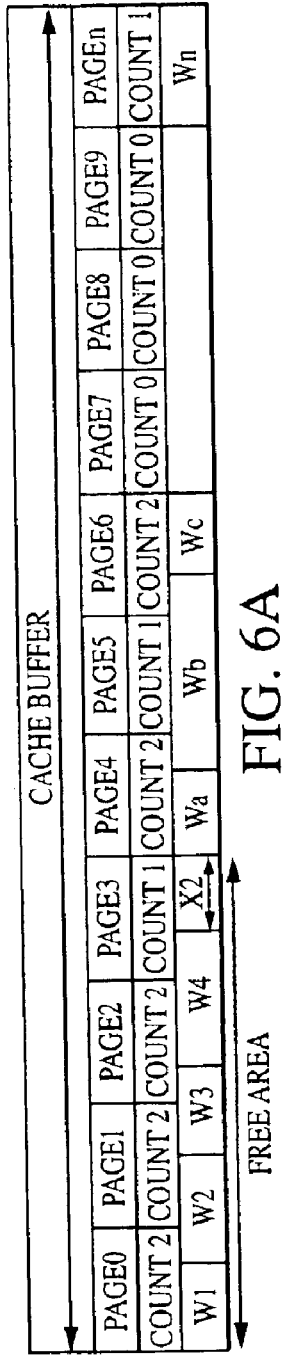
FIGS. 6(A)–6(C) are charts that describe a third embodiment of data packet storage according to the present invention.
Figure 6B:
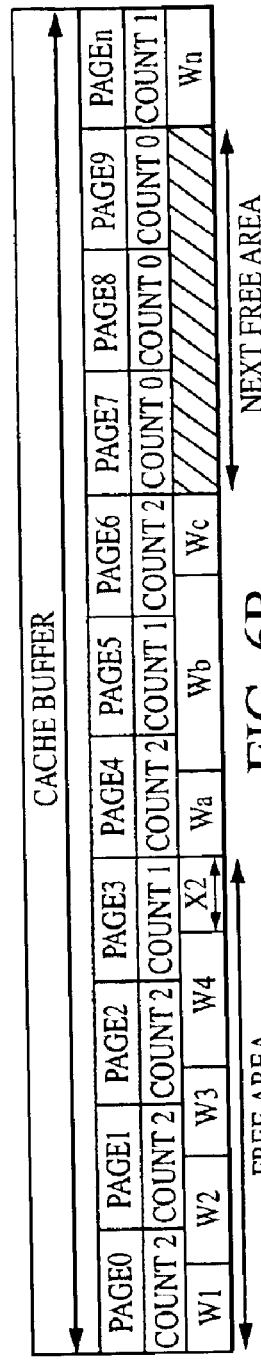
Figure 6C:
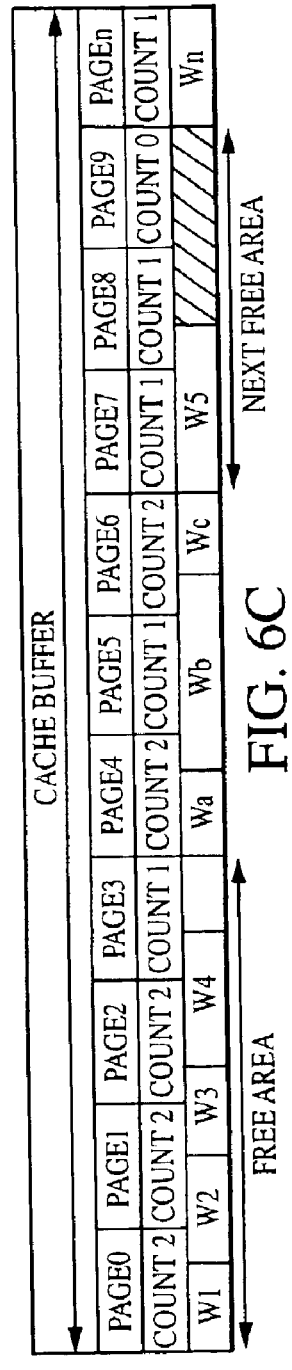

FIGS. 6(A)–6(C) describe a third way for data packet W1–W5 storage. In the third way, the length of the data packets is known by the HDD when the write command is received. In the third way, the same procedures shown in FIGS. 4(A)–4(D) are executed except that there is no procedure of comparison of the remaining sector numbers with the predetermined number X1. In FIG. 4, X1 is a predetermined value, and in FIG. 6, X2 is the remaining free space. Instead of having an execution of the comparison, when each of the write data W1–W5 is received, MPU 36 determines if the sector number of each of the write data of W1–W5 is greater than the remaining sector number of the free area by subtracting the sector number of write data from the remaining sector number of the free area. If it finds that the remaining sector number of the free area is greater than the sector number of write data, it stores the write data into the free area of the cache buffer. As shown in FIG. 6(A), the write data of W1–W4 are stored over the pages 0–3 of the free area.

However, when receiving the write data of W5, the remaining sector number X2 in the free area is less than the sector number of the write data of W5. Thus, MPU 36 stops storing the write data of W5 into the free area of the pages 0–3

Then, MPU 36 moves in execution of a new free area search operation, and it finds a new continuous free area in pages 7–9, since the values of the counter of these pages 7–9 are all "0", as shown in FIG. 6(B). After securing the new continuous free area, it starts procedures of storing the write data of W5 in page 7, as shown in FIG. 6(C).

Figure 7:
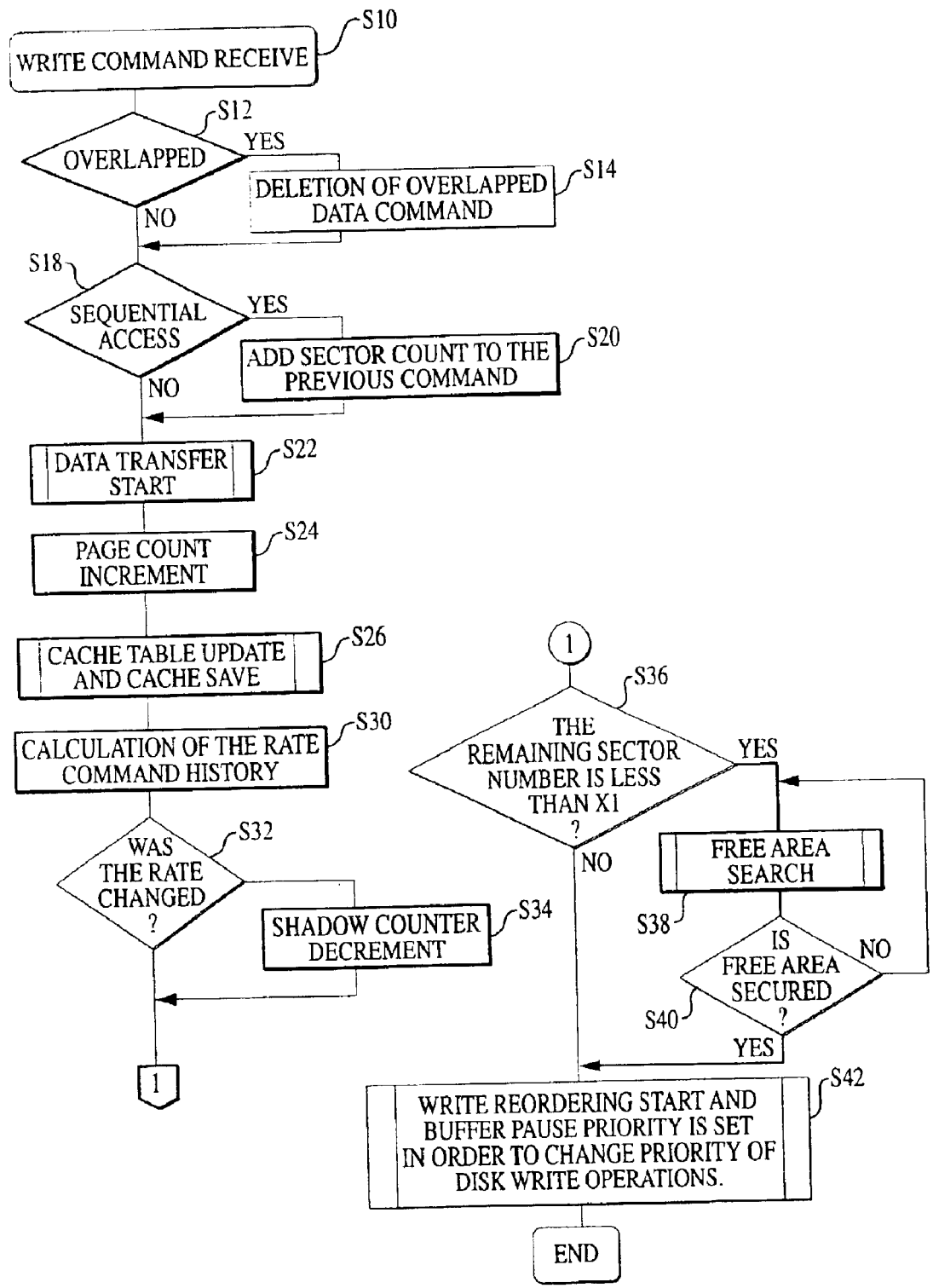
FIG. 7 is a flow chart showing the sequence of events for a data transfer operation in relation to the first embodiment described with reference to FIG. 4.

FIG. 7 is a flow chart showing the sequence of events for a data transfer operation in relation to the first way as described above with reference to FIGS. 4(A)–4(G).

When a write command is received at the step S10, the MPU 36 executes a free area search operation. While executing the search operation, MPU 36 determines whether the data to be written to the memory medium overlaps with data of a previous write command for which data transfer has been completed at the step S12. If there is overlap, the requested data of the new command is overwritten onto an area of the cache buffer in which the same data from the previous write command was written. Then, an overlapped data deleted command is executed at the step S14, and the data transfer operation is executed. If there is no overlap at step S12, or if the overlapped data is deleted at step S14, MPU 36 goes to the next step S18.

If the free area is secured in the free area search operation, as shown in FIG. 4(A), MPU 36 calculates the total number of the sectors in the free area by multiplying the predetermined sector number for one page by the number of pages secured in the free area search operation.

Sequential access step S18 determines if a new command has a sequential relationship with the command immediately preceding the new command. If there is sequential access, i.e., if data for a write command is immediately followed by data for another write command, the data of the new write command is transferred to a position in the buffer immediately following the data of the previous write command (i.e, W2 immediately follows W1), in order for the data of the new write command to be continuous with the data of the previous write command. If there is sequential access, the sector count of the previous write command is adjusted by adding the number representing the sector of the new write command to the sector count of the previous command at the step S20. After that, the new write command is disregarded.

If there is no sequential access at S18, or if the sector count has been adjusted at S20, then data transfer to the cache buffer starts at the step S22. Here, MPU 36 receives a number of sectors for the write data through communications with the host system after receipt of a write command. Then, it subtracts the number of sectors for the write data from the total number of sectors of the free area, and stores the calculation result in a temporary storage, e.g. S-RAM 38, for later use. Usually, a number of pages, namely a number of continuous sectors, obtained in the free area search operation are relatively large in relation to the number of sectors for write data.

At the step 24, after the data transfer operation is completed as shown in FIG. 4(B), MPU 36 increments the values of page counters of the pages in which write data has been stored in the previous step S22. Also, it saves an access extent of the received command, namely the lead address of the data and the end address of the data, both of which are LBA, and the address of the data in the cache buffer, into the cache table 39 as a cache information of data at the step S26. MPU 36 creates the cache table 39 in S-RAM 38 when powered on and updates all of the tables after processing of read/write commands or packets.

The command history is calculated after the data and the cache information are saved in the cache buffer and the table respectively, at step S30. The command history is a cache function of a hard disk drive. In the command history function, MPU 36 determines the percentage of read commands in the read/write commands through the sample number of read commands and write commands issued from the host system that have been received by disk drive. The sample number of the read/write commands, which is a predetermined number, may be varied dependent upon the operational circumstances in the disk drive.

Here, MPU 36 is provided with the weight rate table 41 (FIG. 8), which is stored in the S-RAM 38. The weight rate table 41 is predetermined in a factory or a design stage of a hard disk drive. The weight rate table stores the relationship between the percentage of read commands in the read/write commands and the weight rate, as shown in FIG. 8. FIG. 8 shows the table 41 storing the relationship between the read command rate and the weight rate. If the obtained percentage is a value of 0%, then the weight rate is "0". If the obtained percentage is a value from 1% to 34%, the weight rate is "1". If the percentage is between 35% and 67%, the weight rate is "2". If the percentage is over 68%, it is "3". The relationship between the percentage and the weight rate may be changed and may be divided as desired, based upon operational circumstances, performance, or the like. The weight rate is used to determine an initial value of shadow counters of the pages.

According to the calculated percentage rate, MPU 36 obtains the weight rate by referring to the relationship table S30 (FIG. 7). If the rate has been changed at the step S32, then the shadow counters of all of the pages are decremented at the step S34. If there is no rate change at the step S32, or if the value of all of the shadow counters is decremented at the step S34, MPU 36 goes to the next step at the step S36.

MPU 36 determines if the remaining sector number of the free area in the cache number is less than a predetermined sector number X1 (S36). If so, it goes to execution of a new free area search operation at the step S38, as shown in FIG. 4(F). The predetermined sector number X1 is depicted in FIG. 4(F). Then, it is determined whether the next free area has been successfully secured at the step S40. If not, it goes back to the step S38.

If no at the step S36, or if the next free area is obtained at the step S40, MPU 36 goes to step S42. In the step S42, write reordering starts and buffer pause priority is set, if both are required.

The function of the write reordering is to change the order of disk write operations of write commands. The priority of reordering is decided dependent upon a physical position of data in the write command on a disk medium. A write command, directed to data that is physically closer to a physical position of data of a write command currently under disk write operation than to that of other write commands, is given higher priority for reordering. Based upon the write reordering, the order of processing write commands is changed and the reordered write commands are stored into a queue table for disk write operations.

The function of the buffer pause priority is to set a flag for a write command such that it has the highest priority at the write reordering. After completion of the step S42, MPU 36 waits until it receives a new command with respect to the routine of FIG. 7.

Figure 9:
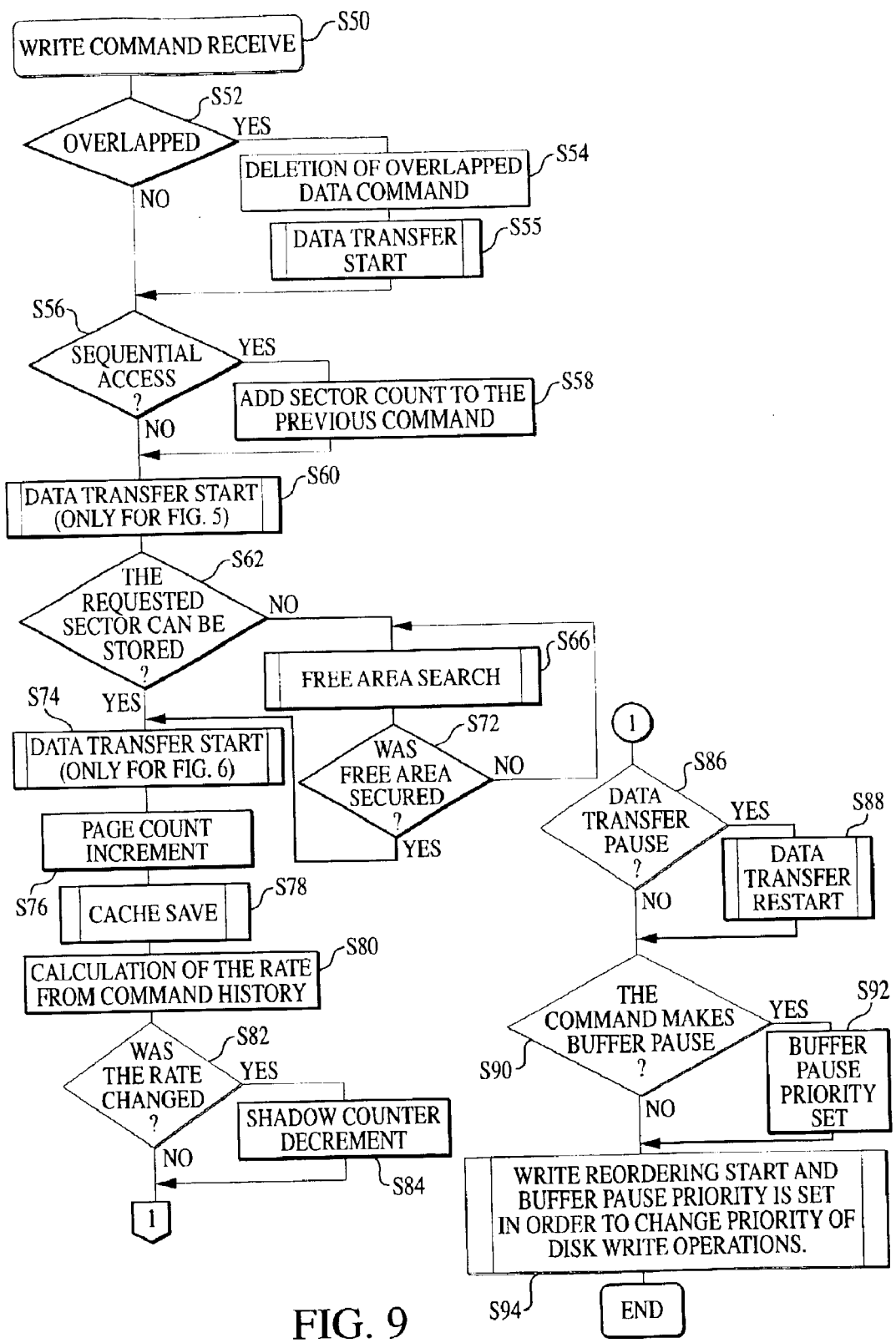
FIG. 9 is a flow chart showing the sequence of events for a data transfer operation in relation to the second and the third embodiments as described with reference to FIGS. 5 and 6.

FIG. 9 is a flow chart showing the sequence of events for a data transfer operation in relation to the second and the third ways, described with reference to FIGS. 5(A)–5(C) and 6(A)–6(C).

When a write command is received at the step S50, the MPU 36 executes a free area search operation. While executing the search operation, MPU 36 determines whether the data to be written to the memory medium overlaps with data of a previous write command for which data transfer has been completed at step S52. If there is overlap, the requested data of the new command is overwritten onto an area of the cache buffer in which the same data from the previous write command was written. Then, a delete overlapped data command is executed at the step S54, and the data transfer operation is executed at the step S55. If there is no overlap at the step S52, or if the overlapped data is deleted as at the step S54, MPU 36 goes to the next step S56.

If, in the free area search operation, the free area is secured, as shown in FIG. 4(A), MPU 36 calculates the total number of sectors for the free area by multiplying the predetermined sector number (i.e., number of sectors) for one page by the number of pages secured in the free area search operation.

Sequential access step S56 determines if a new command has a sequential relationship to the command immediately preceding the new command. If there is sequential access, i.e., if data of one write command is immediately followed by data of another write command, the data of the new write command is transferred to a position in the buffer immediately following the data of the previous write command (i.e, W2 immediately follows W1), in order for the data of the new write command to be continuous with the data of the previous write command. If there is sequential access, the sector count of the previous write command is adjusted by adding the number of sectors of the new write command to the sector count of the previous command at the step S58. After that, the new write command is disregarded.

If there is no sequential access at step S56, or if the sector count has been adjusted at S58, then data transfer to the cache buffer starts at step S60. The step S60 is not carried out for the write operation described with reference to FIG. 6 because the data of the write command may not be stored in the free area.

After the data transfer is completed as shown in FIG. 4(B), MPU 36 increments the values of page count of the pages in which write data has been stored in the previous step S60. Also, it saves the access extent of the received command, namely the lead address of data and the end address of data, both of which are LBAs, and the address in the cache buffer, into a cache table as a cache information of data for the write data stored in the previous step S60. MPU 36 creates the cache table in S-RAM 38 when powered on and updates after processing read/write commands.

MPU 36 determines whether or not the requested sector of data for the write command can be stored in the free area obtained in the free area search operation for the write operation of FIGS. 6(A)–6(C) at step S62. That is, the system determines whether there is enough remaining storage capacity in a free area currently in use in the cache buffer to store the new data related to the new write command. If so, the data for the new write command is transferred into a position in the cache buffer. The position follows a position of the data of the previous command. Thus, write data is made continuous in the cache buffer.

For the write operation of FIGS. 5(A)–5(C), whether the requested sector of data for the write command can be stored in the buffer at the step S62 depends on whether there is no space in the secured free area, determined through the decrementation operation as described above with reference to FIGS. 5(A)–5(C). Where it is determined that there is no space, the transfer of write data is stopped during the middle of the data transfer. Namely, a part of the write data is stored in the first free area in the cache buffer.

If the requested sector cannot be stored at the step S62, a free area search is conducted at the step S66. Further, if not at the step S62, the data transfer for the data of the new write command is stopped and MPU 36 makes a data transfer pause. Then, it is determined if a free area of particular pages is secured at the step S72. If not, then the free area search continues by changing the free area search pattern to a different free area search pattern until a sufficient free area is secured at the step S72.

If the requested sector can be stored at the step S62, then MPU 36 starts a data transfer operation in which write data is stored in a free area of the cache buffer at the step S74. After the data transfer is completed at the step S74, MPU 36 increments the values of page count of the pages in which write data has been stored in the previous step S74 at the step S76. Also, it saves the access extent of the receipt command, namely the lead address of data and the end address of data, both of which are LBAs, and the address in the cache buffer, into the cache table 39 or other table created in S-RAM 38 for cache information of data in addition to information to indicate that divided write data is present in the cache buffer and the location thereof for the write-operation of FIG. 5, at the step S78.

The command history is calculated at the step S80 after the data and the cache information are saved in the cache buffer and the table, respectively, as described in the write operation flow chart of FIG. 7. In the command history function, MPU 36 makes a calculation of the percentage of read commands in the read/write commands through the sample number of read commands and write commands issued from the host system that had been received by the disk drive. The calculated percentage can be called the read command rate.

According to the obtained percentage, MPU 36 obtains the weight rate by referring to the relationship table (FIG. 8). If the read command rate has changed at the step S82, then the shadow counter for all of the pages is decremented at the step S84. If it is determined that the read command rate has not changed at the step S82, or if the value of all of the shadow counters is decremented at the step S84, MPU 36 moves to step S86.

In the next step S86, MPU 36 determines whether there has been a data transfer pause. If so, the data transfer is restarted at the step S88. For the write operation of FIGS. 5(A)–5(C), the data transfer operation is such that the remaining part of the write data is stored in the newly obtained next free area of the cache buffer. MPU 36 here registers, in S-RAM 38, as explained above with reference to FIGS. 5(A)–5(C), information to indicate that the write data in the first free area has a remaining part in the next free area. Following the completion of the data transfer for the remaining write data, MPU 36 executes operations of page count increment, cache save, calculation of read command rate, determining rate change, and shadow counter decrement.

For the write operation of FIG. 6, MPU 36 executes the same operation of steps S74–S84 in the step S88.

If there has not been a data transfer pause, it is determined whether the command places the buffer in a pause state at the step S90. If so, the buffer pause priority function is set S92. In the step S94, the write reordering function starts and buffer pause priority function is set, if both are required in order to change the order of disk write operations for write data.

After the completion of step S94, MPU 36 waits-until it receives a new command with respect to the routine of FIG. 9.

Figure 10:
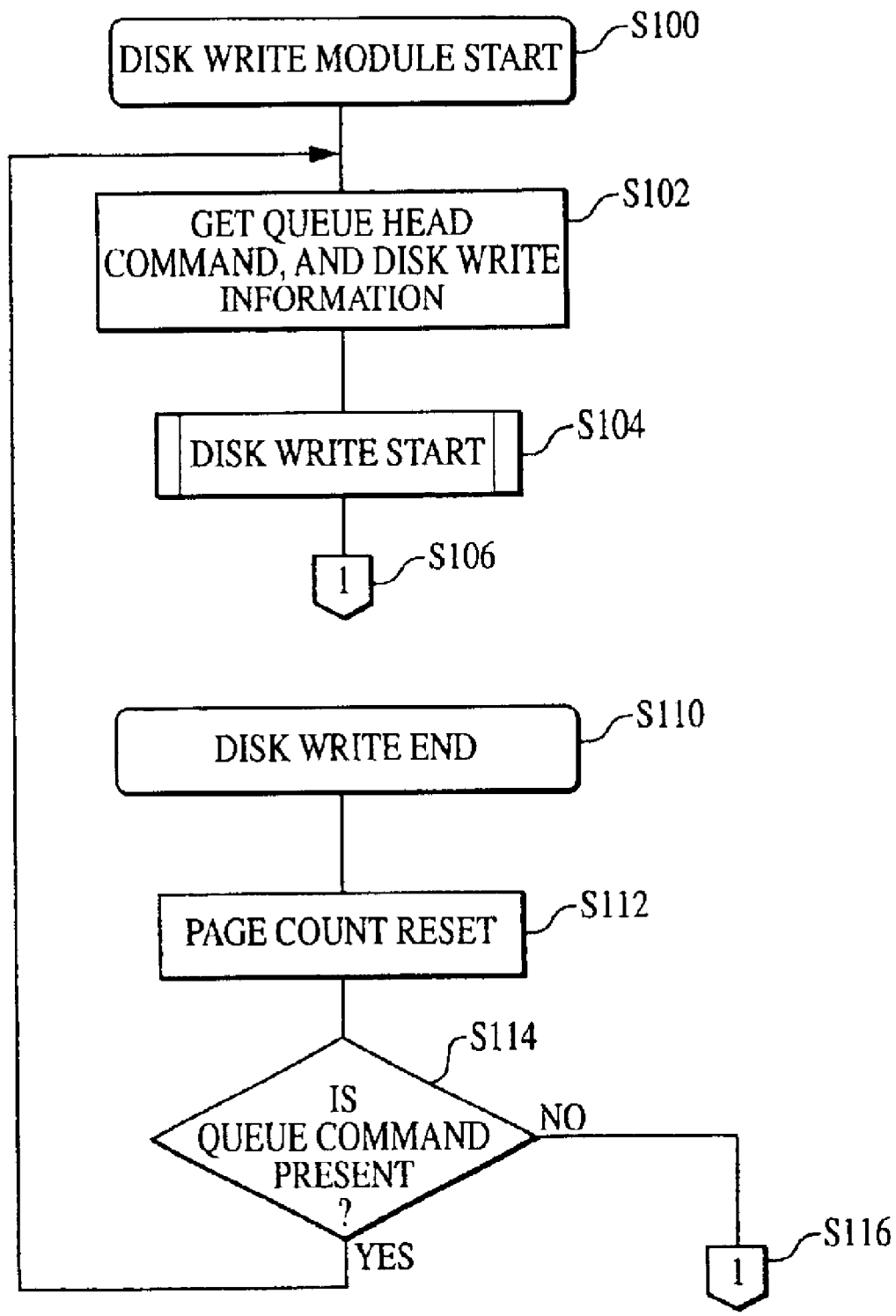
FIG. 10 is a flow chart of a disk write operation.

FIG. 10 is a flow chart of a disk write operation.

The disk write operation is an operation of writing an unwritten write data of the cache buffer into a disk storage medium. It is asynchronously executed with the write operations of FIGS. 7 and 9. It is executed as long as there is a queue in a queue table of S-RAM 38.

A disk write module for the disk write operation is initiated at the step S100. MPU 36 then selects a top command in the queue table and obtains disk write information for write data at the step S102. Then it starts the disk write based upon the information at the step S104. Until the disk write operation is completed, it jumps to "1" and loops at step S106, and waits for the end of the disk write operation.

Where the disk write operation is completed at step S110, MPU 36 resets the value of the page counter for the page, which stores the write data written through this disk write operation at step S112. Then, it searches the queue table. If there is a queue command in the queue table at the step S114, it goes back to the step S102. If not, it jumps to "1", then it loops within "1" at the step S116 while waiting for the next disk write operation.

FIG. 11 shows another data transfer operation of this invention.

In FIG. 11(A), MPU 36 executes a free area search operation with settings, in which the minimum page number for the search is "2" and the maximum page number for the search is "10". It executes the search operation, and finds, as a free area, ten continuous pages each having "Open" status, as shown in FIG. 11(A).

Here, the received command is a write command of random access. Commands W1–W12 will be received. In fact, 10 pages of free area is secure. Then, random write commands W1–W11 are received and plural write data of write commands W1–W11 is stored into the cache buffer. Then, the respective page counters of the pages 0–9 store a count value in accordance with the stored write data. Through receipt of write command W11, the free area currently in use is given a full status, as shown in FIG. 11(B).

In order to receive the next command into the other free area, a free area search operation is carried out. But, since there is no open page, the receipt of the next write command W12 is set to wait status by MPU 36. It waits until an open page is available in the cache buffer.

While waiting, disk write operations of the write commands W2, W5, W8, W10, and W11 are completed. Then, the counter values of at least page 7 through page 9 are changed to "0", and at least pages 7–9 become "Open" status, as shown in FIG. 11(C). Here, the disk write operation for the write commands W2, W5, W8, W10, and W11 are prioritized through the write reordering and buffer pause priority operations.

Figure 11D:
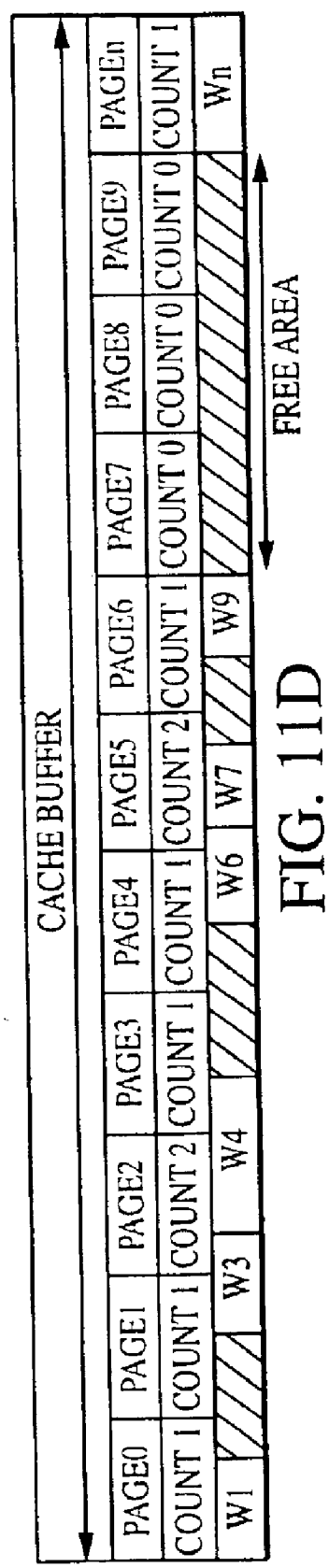
Figure 11E:
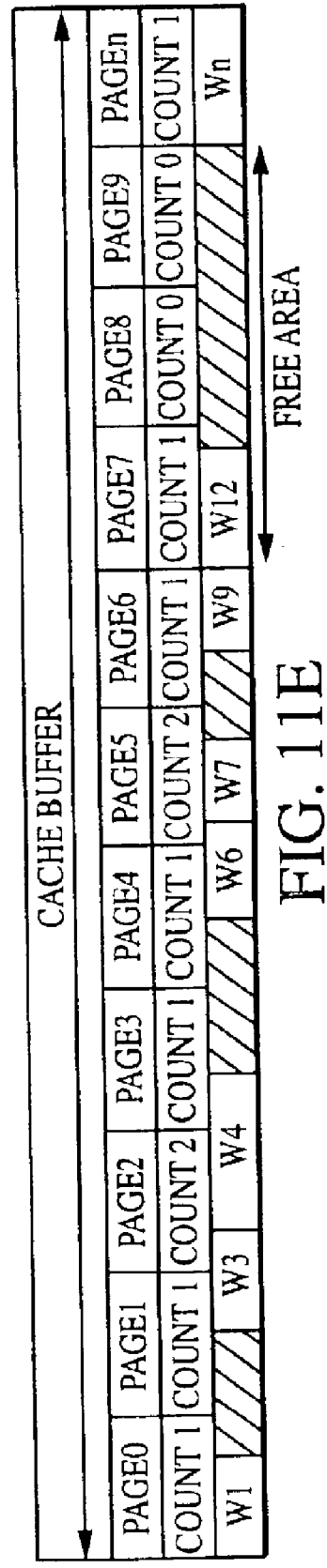

Through a new free area search operation, pages 7–9 are selected as a new free area for the next command, as shown in FIG. 11(D). Then write command W12 is received. The write data of write command W12 is stored in page 7 of the newly obtained free area, as shown in FIG. 11(E). In this description, searching an empty area is done through the page whether the page is open or not.

Figure 12:
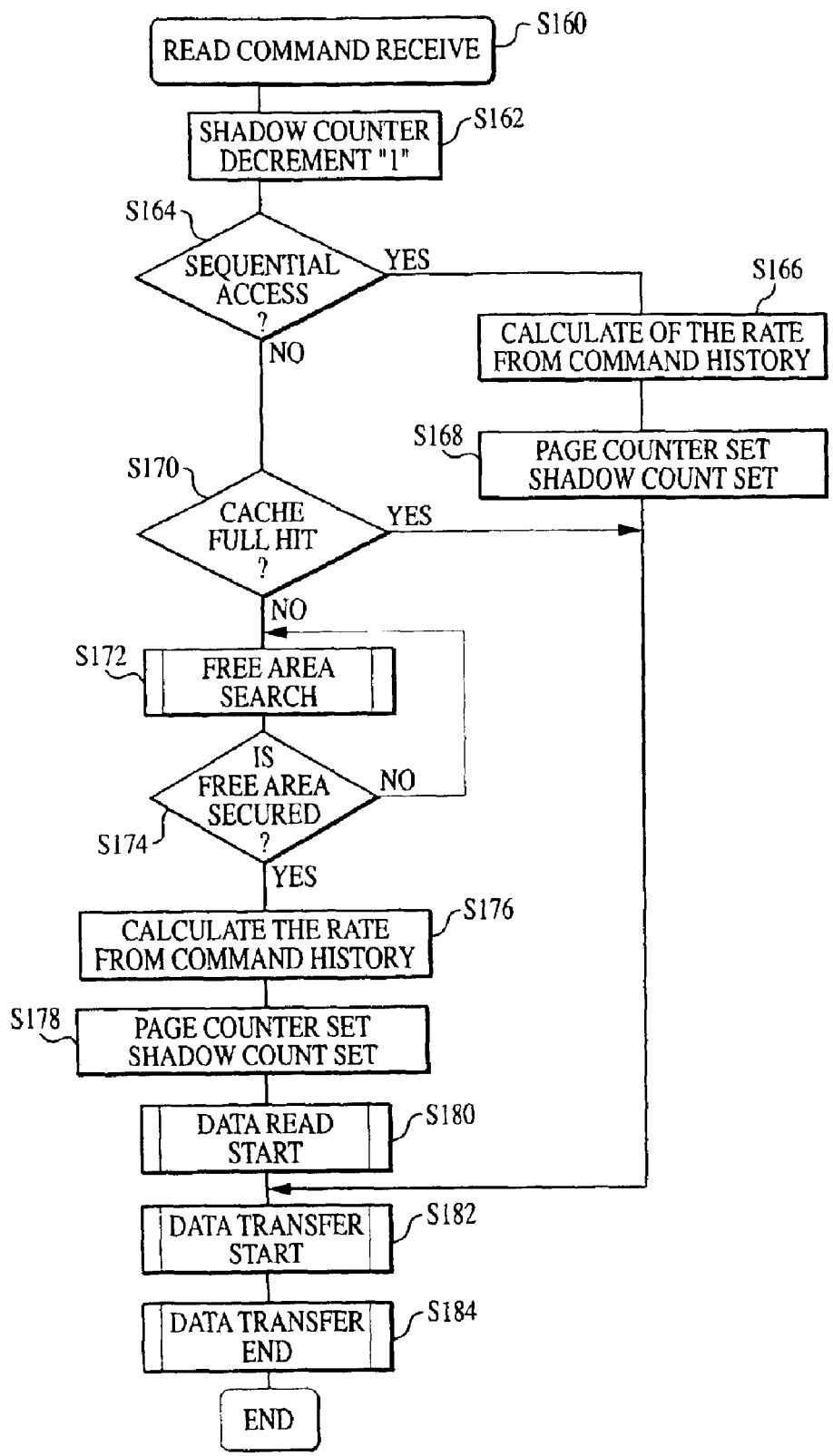
FIG. 12 shows a flow chart for read operations.

FIG. 12 shows a flow chart for read operations.

When a read command is received at the step S160, MPU 36 decrements a shadow counter of a page, which stores read data of the previous read command at the step S162. Then, it determines whether the previous command was a read command and whether it is for a sequential access at the step S164. That is, if so, then it calculates the read command rate from the command history at the step S166 and sets the page counter and the shadow counter for the page, which stores read data of the read command at the step S168. Data transfer operation starts at the step S182, and the algorithm ends at the step S184 when data transfer is completed.

If there is no sequential access, for example, if the command previous to the read command was a write command, then it is determined whether the cache data makes full hit at the step S170. If so, the data transfer operation starts immediately at the step S182. If not, a free area search is conducted at the step S172. The pages are consecutively searched until a free area is secured at the step S174. The read command rate is calculated from the command history at the step S176. This is the same operation described for the write operations. Further, the page counter and shadow counter for a page, which store read data read out from a storage medium, are set at the step S178.

The storage medium is then read at the step S180, and data is transferred at the step S182. MPU 36 limits the size of read data retrieved from the storage medium to less than the maximum storage capacity of one page at each retrieval. Thus, all read data stored in one page remains valid unless the page is set to open.

Such a rate obtained from the table shown in FIG. 8 is fed into the shadow counters provided for the respective pages of the cache buffer. On this shadow count, the page of the cache buffer used in the read command is protected from an immediate request of use for next read/write commands. Then, the read data stored in the pages is protected for a while. Unless the shadow counter of a page has a value other than zero, read cache data stored in the page is protected. The rate is adjustable based upon performance tuning of the hard disk drive.

FIGS. 13(A)–13(G) describe a first way that using the shadow counter in a command history operation protects read data in the cache buffer. The command history is one of the cache functions. The command history operation when random access read commands R1, R2, and R3 with the weight rate "2" are received will now be explained.

In FIGS. 13(A)–13(G), pages 0–9 are shown for description of the command history operation. Obviously, in the cache buffer many more than 10 pages are formed. In FIGS. 13(A)–13(G), a page counter and a shadow counter are provided for each of the pages. The values of the page counter and the shadow counter are stored in the S-RAM with the respective pages to form a table as shown in FIGS. 13(A)–13(G). In FIGS. 13(A)–13(G), the row of "Status" and the row of "Command" are only for description and ease of understanding the operation. The "Status" and "Command" rows are not formed in the table.

As shown in FIG. 13(A), there are three open areas that can be used for read/write operations. The open areas are the pages 1, 3, and 4. The values of page counters for the pages 1, 3, and 4 thus should all be "0". The remaining areas (pages) are in use for write data in FIG. 13(A) because the values of page counts for the remaining pages are "1". This means that the remaining pages are in the status of write waiting, and the queue for the write command for the remaining pages is stored in the queue table. Unless the queue for the pages are completed by MPU 36, the page counter of the page remains "1" and then the status of the pages is kept on "Hold". These procedures are also applicable to the read command.

Then, a random access read command R1 is received, as shown in FIG. 13(B). After receipt of the read command, a free area search operation is initiated, and then page 1 is secured as a free area for the read command R1. Here, the read command R1 is received with a weight rate "2", which is explained with reference to and shown in FIG. 8. The read data for one read command is stored within one page of the cache buffer. On receipt of the read command R1, MPU 36 assigns page 1 for the read command R1 through the free area search operation, and changes the value of the page counter from "0" to "1". Thus, the status and the command for page 1 are "HOLD" and "R1" respectively. Further, since the weight rate is presently held to "2", the value "2" is set to the shadow counter of page 1.

At the time of receiving the next read command R2, MPU 36 assigns page 3 secured through a new free area search operation for the next read command R2 (FIG. 13(C)). It decrements a value of the shadow counter for the read command R1 by 1. This means that the shadow count of page 1 goes down from 2 to 1. It also sets the page counter and the shadow counter of page 3 to "1" and "2" respectively, as shown in FIG. 13(C).

As shown in FIG. 13(D), at the time of receiving the next read command R3, MPU 36 assigns, for the next read command R3, page 4 found in a further new free area search operation. Then, it decrements the value of the shadow counters for the read commands R1 and R2 by one, respectively. This means that the shadow count of page 1 goes down from "1" to "0" and the shadow count of page 3 goes down "2" to "1". It also sets the page counter and the shadow counter of pages 4 to "1" and "2" respectively.

Here, if the read data for read command R1 had been transferred before receiving the read command R3, the page counter of page 1 might be changed from "1" to "0" at the time of the data transfer of the read data for read command R1. However, until receiving the read command R3, the table keeps the value of the shadow counter of page 1 the value of "1". Thus, at the time of receiving the read command R3, it decrements the shadow counter of page 1 by one if the read data for page 1 has been transferred. Whether the read data has been transferred is determined by referring to the queue table in the S-RAM 38 by MPU 36.

At this timing, page 1 is given an "Open" status, as shown in FIG. 13(E), and is released for following read/write commands. This means that the read data of the read command R1 is maintained in the cache buffer as valid data until the next read command R3 comes to the disk drive. This is because the data transfer operation of read/write data stored in the cache buffer is carried out under control of the HDC 40 asynchronously with processing of read/write commands under control of the MPU 36. Such separate controls of HDC and MPU are well known in the art, so specific operations for both and the relationship between those are not described here. Where the next read command R4 of a random access is issued from the host system and is received by the hard disk drive, MPU 36 in the disk drive assigns, for the next read command R4, the page 1 found in a newly executed free area search operation. Then, it decrements the value of the shadow counters for the read commands R2 and R3 by one, respectively. This means that the shadow count of page 3 goes down from "1" to "0" and the shadow count of page 4 goes down from "2" to "1". It also sets the page counter and the shadow counter of page 4 to "1" and "2" respectively, as shown in FIG. 13(F).

If the read data of the read command R2 has been transferred, it also decrements the value of the page counter of page 3 at the time of receiving the read command R4. At this timing page 3 is changed to "Open" status, even though the read data for read command R2 has been transferred before receiving the read command R4, as shown in FIG. 13(G).

As described above, unless the values of the shadow counter for the pages are set to "0", the entire read data stored in the page remains valid. Furthermore, the holding time of the read data in the cache buffer varies the read command rate, so the cache hit rate is not badly deteriorated.

FIGS. 14(A)–14(F) describe another way that using a shadow counter in a command history operation protects read data in the cache buffer.

The command history operation, when read commands R1 and R2 and a write command W1 in random accesses are mixed up, will be explained with reference to FIGS. 14(A)–14(F). Here, these commands are received with the weight rate "2" in the way of FIGS. 14(A)–14(F) and the read data for one read command is stored within one page of the cache buffer.

Similar to FIGS. 13(A)–13(G), pages 0–9 are used for the description, and a page counter and a shadow counter are provided for each of the pages. The values of the page counter and the shadow counter are stored in the S-RAM with the respective pages to form the table 39 as shown in FIG. 14(A). In FIG. 14(A), the row of "Status" and the row of "Command" are only for description and ease of understanding the operation. The rows of "Status" and "Command" are not formed in the table.

It is assumed that, similar to FIG. 13(A), there are three open areas that can be used for read/write commands in random access, which are pages 1, 3, and 4. Further, it is assumed that the remaining areas (pages) are in use for write data in FIG. 14(A) because the values of the page counts for the remaining pages are "1". This means that the remaining pages are in the status of write waiting, and queues for the write command for the remaining pages are stored in the queue table. Unless the queue for the pages are completed by MPU 36, the page counter of the page remains "1" and then the status of the pages is kept on "Hold". These procedures are also applicable to the read command.

Then, a random access read command R1 is received, as shown in FIG. 14(A). After receipt of the read command, MPU 36 initiates a free area search operation, and then page 1 is secured as a free area for the read command R1. Then, the software algorithm assigns page 1 for the read command R1, and changes the value of the page counter of page 1 from "0" to "1". Thus, the status and the command for page 1 become "HOLD" and "R1" respectively. Further, it also sets the shadow counter of page 1 to "2".

At the time of receiving the next read command R2, page 3 is secured through a new free area search operation and assigned for the next read command R2. The program decrements a value of the shadow counter for the read command R1 by 1, and also sets the page counter and the shadow counter of page 3 to "1" and "2" respectively, as shown in FIG. 14(B).

As shown in FIG. 14(C), MPU 36 receives a write command W1 of random access. The software assigns, for the write command W1, page 4 found in a further new free area search operation. Then, it decrements the value of the shadow counters of page 1 and 3 by "1" respectively. It also increments the page counter of page 4 by "1". The shadow counter of page 4 is not set to any value, thus it is kept to "0".

At this timing, the page counter of page 1 is changed from "1" to "0", as shown in FIG. 14(D), if the read data for read command R1 has been transferred. This means that the read data of the read command R1 is maintained in the cache buffer as valid data until that timing.

Where the next read command R3 of a random access is received, MPU 36 assigns, for the next read command R3, page 1 found in a newly executed free area search operation. Then, the program decrements the value of the shadow counter for page 3 with "1", and also sets the page counter and the shadow counter of pages 1 to "1" and "2" respectively, as shown in FIG. 14(E).

If the read data for page 3 has been transferred before receiving the read command R3, it decrements the page counter of page 3 by "1". At this timing page 3 is changed to "Open" status, as shown in FIG. 14(F).

In page cache, where read commands and write commands are received in random order in a given time frame, a free area secured for read commands tends to be changed to a free area for write commands, but then read data is not processed and the cache hit rate is lowered. As explained above, even if read commands and write commands are mixed in a particular time frame, since the read data of the pages are held valid dependent upon the read command rate by using the shadow counters for the pages, the cache hit rate is not badly deteriorated.

It will now be explained how to escape a buffer full status followed by many sequential accesses which put the cache in a Buffer Pause status.

Figure 15A:
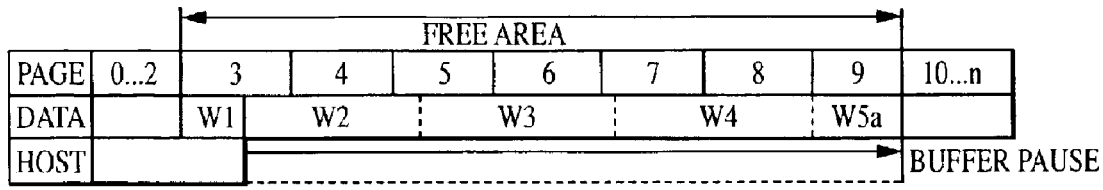
FIGS. 15(A)–15(F) are diagrams showing a first way of escaping the buffer pause status by changing a priority of the disk write operation.

FIGS. 15(A)–15(F) are diagrams showing a first way of escaping the buffer pause status by changing priority of disk write operations. As shown in FIG. 15(A), it is assumed that MPU 36 receives in order a write command W1 of a random access and write commands W2–W7 of a sequential access. In FIG. 15(A), it is also assumed that pages 0–2, and 10–n are in use for write or read commands, and are all in "HOLD" status, and that a free area of pages 3–9 is also secured.

In FIG. 15(A), the write data of write command W1 of a random access is first processed, and is stored in page 3 of the cache buffer. Then, write data of write commands W2–W7 are processed to store the write data into the pages in the free area of the cache buffer following the write data of write command W1. During the data transfer operation of write command W5 (up to W5a) into pages 3–9 when there is no remaining space in the free area, namely the entire cache buffer is full, the buffer full status is acknowledged, and the write operation goes into the buffer pause status.

Figure 15B:
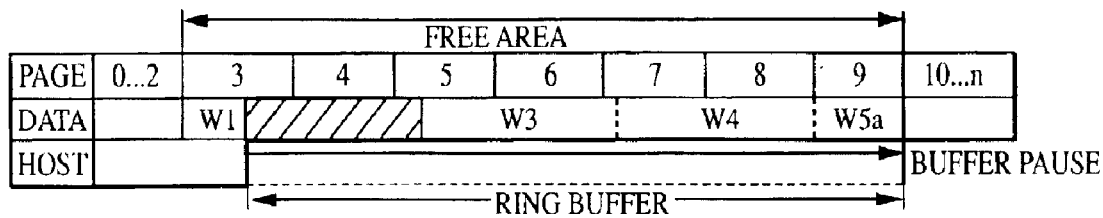

In order to escape from the buffer pause status as soon as possible, priority of the write data of write command W2 is set to the highest level. To do so, the Buffer Pause Priority function, which is one of the cache functions, sets a flag in the column provided in the queue table for the disk write of write command W2. The flag indicates the priority of the disk write has changed to the highest level in the queue table. Then, if the write reordering function reviews the contents of the queue table, it moves the processing order of the disk write for write command W2 to the first position. Thus, the disk write for write command W2 is conducted by the disk write operation as explained above before the disk write of the other commands, e.g. W1. As shown in FIG. 15(B), the hatched portion of pages 3–5 are set to open status for the next write data, which is held in the S-RAM 38.

Figure 15C:
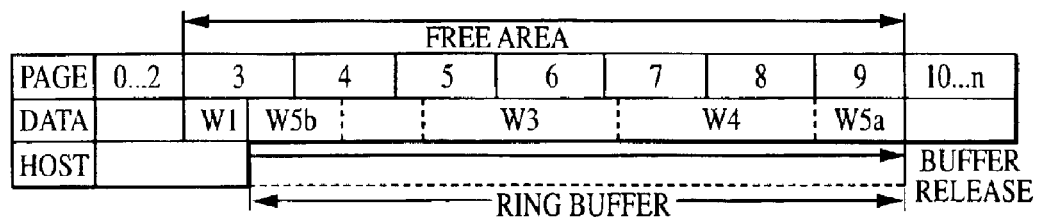

Then, the remaining part of write data W5b is stored in a space of the cache buffer, which has become open status through the buffer pause priority function, the write reordering function, and the disk write operation, as shown in FIG. 15(C).

Figure 15D:
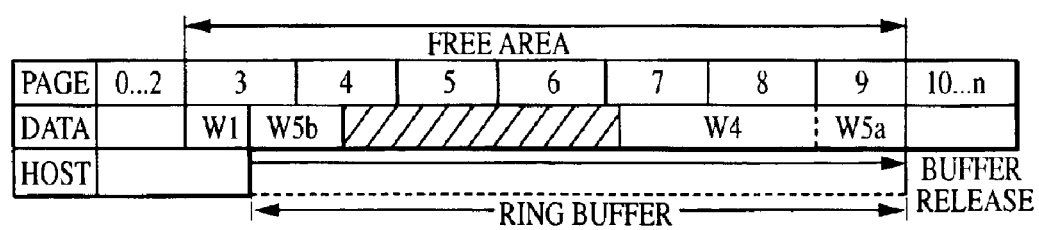
Figure 15E:
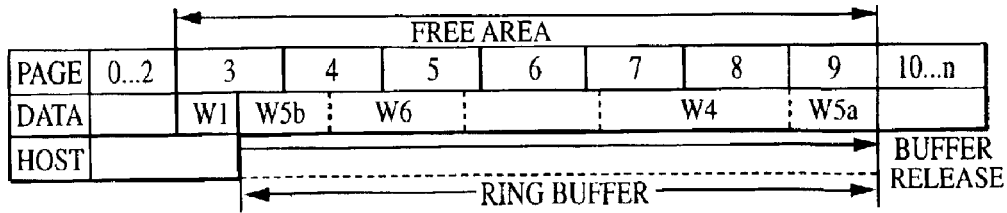
Figure 15F:
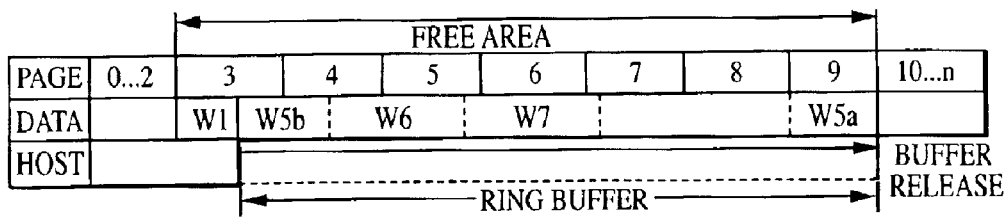

However, there still is not enough space in the cache buffer to store write data of following write commands W6–W7, and the buffer full state is not released. Then, the procedures as explained above are repeated until write data of write commands W6 and W7 is stored in the free area of the cache buffer, as shown in FIGS. 15(D) and 15(E). If write data of the last write command W7 of the sequential access is stored, the buffer pause status is released, as shown in FIG. 15(F). Here, pages 3–9 of the free area are used like a ring buffer when storing write data of the sequential write commands W2–W7.

Figure 16A:
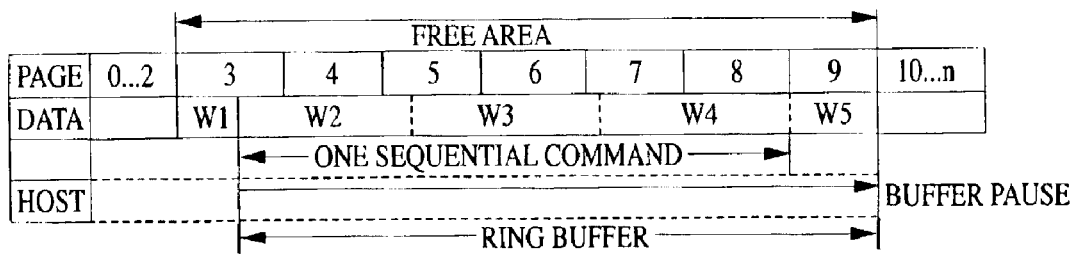
FIGS. 16(A)–16(C) are diagrams showing another way of escaping the buffer pause status by changing a priority of disk write.
Figure 16B:
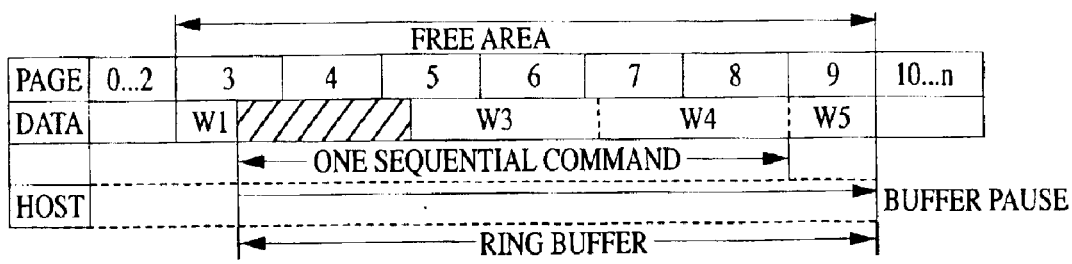
Figure 16C:
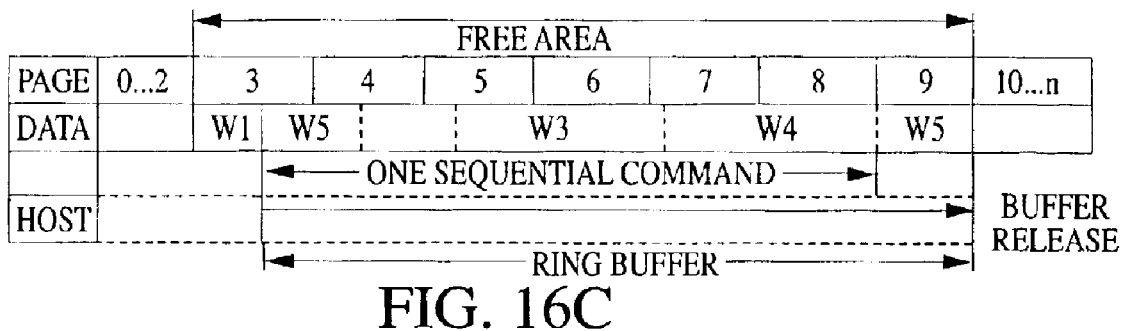
Figure 17:
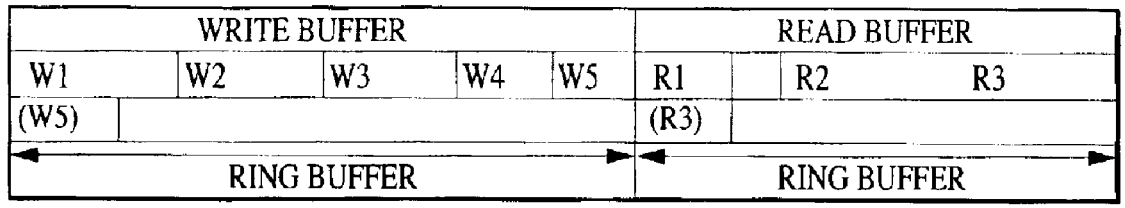
FIG. 17 is a diagram of a cache buffer structure in the prior art.

FIGS. 16(A)–6(C) are diagrams showing another way of escaping the buffer pause status by changing a priority of disk write. As shown in FIGS. 15(A)–15(F), it is assumed that MPU 36 receives in order a write command W1 of a random access, write commands W2–W4 of a sequential access, and a write command W5 of a random access. In FIGS. 16(A)–16(C), it is also assumed that pages 0–2, and 10–n are in use for write or read commands, are all in a "HOLD" status, and that a free area of pages 3–9 is also secured. In FIG. 16(A), the write data of write command W1 of a random access is first processed, and is stored in page 3 of the cache buffer. Then, write data of write commands W2–W4 are processed to store the write data into the pages in the free area of the cache buffer following the write data of write command W1. During the data transfer operation of write data of write command W5 (up to W5a) into pages 3–9 as a free area of cache buffer, when there is no space in the free area, namely the entire cache buffer is filled, buffer full status is acknowledged, and buffer pause status is caused.

In order to escape from the buffer pause status as soon as possible, priority of the write data of write command W2 is set to the highest level. To do so, the Buffer Pause Priority function sets a flag in the column provided in the queue table for the disk write of write command W2. The flag indicates that the priority of the disk write has changed to the highest level in the queue table. Then, if the write reordering function reviews the contents of the queue table, it moves the processing order of the disk write for write command W2 to the first position. Thus, the disk write for write command W2 is conducted by the disk write operation, as explained above, before the disk write of the other command, e.g. W1. As shown in FIG. 15(B), the hatched memory cells of pages 3–5 in FIG. 15(B) are set to the "to be written" status for the next write data. The rewritten statuses of the memory cells are held in the S-RAM 38.

Then, the remaining part of write data W5b is stored in a space of the cache buffer, that has received open status through the buffer pause priority function, the write reordering function, and the disk write operation, as shown in FIG. 16(B). Also, the buffer pause status is released, as shown in FIG. 16(C).

As described above, even if the cache buffer becomes full during the data transfer operation and the data transfer operation is stopped, a disk write operation for write data stored in the same free area as that of the data of which the data transfer operation stops is executed prior to storing the other write data. Thus, the stopped data transfer operation can be restarted within a short time period after stopping the data transfer operation. Namely, a disk write operation for write data of the previous write command in the same sequential write command is prioritized over that of other write commands, e.g. a distinct or independent random write command, so it is possible to escape from the buffer full status without spending much more time and therefore the performance of the disk drive is not lowered.

As explained above, the cache buffer is shared for both read data transfer operation and write data transfer operation. Thus, even if many write accesses amass within a short time, all of the pages of the cache buffer can be used as a buffer for write accesses to the extent that free areas are secured in the cache buffer. This is also true where many read accesses amass within a short time. Thus, even though accesses amass in a short time, the cache hit rate does not deteriorate.

Whether a page is empty or not is determined by whether the values of page counters for the respective pages are "0" or not. Thus, the management and the search of empty spaces in the cache buffer can be simple and easy. The search speed of securing open spaces can be faster.

Furthermore, page cache uses one page in the cache buffer for only one read data. This allows old read cache data to be maintained within a cache buffer relatively longer, since old cache data is maintained as long as the values of shadow counters are greater than the specified value, e.g. "0". Further, page cache shares a cache buffer for both read and write accesses and all spaces of the cache buffer can be used to store only read data or only write data, so the possibility of old data being overwritten by new data is lowered.

While the principles of the invention have been described above in connection with specific apparatus and applications, it is to be understood that this description is made only by way of example and not as a limitation on the scope of the invention.

What is claimed is:

1. A method for storing data in a cache buffer in a storage apparatus having a nonvolatile memory medium, the cache buffer having a plurality of volatile memory cells, comprising the steps of:

logically dividing the memory cells into a plurality of pages, registering an open status in a counter for each page in which all memory cells are available to store new data, registering a full status in the counter for each page that does not have memory cells available to store new data, storing the new data in pages having the open status, searching for empty space by checking values of page counters provided for the respective pages; and calculating a read command rate from a command history.

2. The method of claim 1 including a step of determining a weight rate from the read command rate.

3. The method of claim 2 including a step of assigning the weight rate to shadow counters provided for the respective pages.

4. The method of claim 1 including a step of executing a free area search operation after a data transfer operation is stopped, where previously searched empty space contains data.

5. The method of claim 4 including a step of changing a search pattern to a different search pattern.

6. A method for controlling a cache buffer, comprising the steps of:

determining if pages are open status or not based upon values of page counters provided for respective pages comprised of plural continuous memory cells in the cache buffer, storing data into the pages determined to have open status in the step of determining;

searching for empty space by checking values of page counters provided for the respective pages; and calculating a read command rate from a command history.

7. The method of claim 6 wherein during storing write data of write commands of sequential access, where the cache buffer becomes full, prioritizing data write operations of write data of sequential access write commands.

8. A control apparatus for a disk drive having a cache memory, the cache memory being comprised of memory cells, the memory cells being logically divided into a plurality of pages, comprising:

page counters provided for the respective pages to indicate whether or not the respective pages have an open or full status, the open status indicating that new data can be stored in the respective page, and the full status indicating that new data cannot be stored in the respective page;

a controller that updates the values of the page counters dependent upon completion of transfer of data stored in the pages; and wherein the control apparatus further comprises shadow counters provided for the respective pages to calculate a read command rate.

9. The control apparatus of claim 8 comprising means for calculating the read command rate from the shadow counters.

10. The control apparatus of claim 8 comprising means for determining weight rate based upon the calculated read command rate.

11. The control apparatus of claim 8 comprising means for storing data into pages of the cache buffer having the open status.

12. The control apparatus of claim 8 comprising means for changing priority of data write operations of write data of sequential access write commands where the cache buffer becomes full during storing write data of write commands of sequential access.

* * * * *